United States Patent
Reial et al.

(10) Patent No.: US 12,143,964 B2
(45) Date of Patent: Nov. 12, 2024

(54) ROBUST UE-AUTONOMOUS ANTENNA ADAPTATION

(71) Applicant: Telefonaktiebolaget LM Ericsson (publ), Stockholm (SE)

(72) Inventors: Andres Reial, Lomma (SE); Sina Maleki, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 369 days.

(21) Appl. No.: 17/605,134

(22) PCT Filed: Apr. 28, 2020

(86) PCT No.: PCT/EP2020/061717
§ 371 (c)(1),
(2) Date: Oct. 20, 2021

(87) PCT Pub. No.: WO2020/221725
PCT Pub. Date: Nov. 5, 2020

(65) Prior Publication Data
US 2022/0232522 A1 Jul. 21, 2022

Related U.S. Application Data

(60) Provisional application No. 62/842,199, filed on May 2, 2019.

(51) Int. Cl.
*H04W 4/00* (2018.01)
*H04W 24/08* (2009.01)
(Continued)

(52) U.S. Cl.
CPC .......... *H04W 72/02* (2013.01); *H04W 24/08* (2013.01); *H04W 72/0446* (2013.01);
(Continued)

(58) Field of Classification Search
CPC ..... H04W 72/02; H04W 72/23; H04W 72/54; H04W 72/50
See application file for complete search history.

(56) References Cited

U.S. PATENT DOCUMENTS

| | | | | |
|---|---|---|---|---|
| 11,595,087 | B2* | 2/2023 | Yuan | H04L 5/0023 |
| 2012/0140667 | A1* | 6/2012 | Nakayama | H04J 11/005 |
| | | | | 370/252 |

(Continued)

FOREIGN PATENT DOCUMENTS

| | | |
|---|---|---|
| CN | 103327584 A | 9/2013 |
| CN | 104335651 A | 2/2015 |

OTHER PUBLICATIONS

Qualcomm Incorporated, "Triggering Adaptation of UE Power Consumption Characteristics", 3GPP TSG-RAN WG1 Meeting #95, Nov. 12-16, 2018, pp. 1-17, Spokane, Washington, R1-1813448.

(Continued)

*Primary Examiner* — Shantell L Heiber
(74) *Attorney, Agent, or Firm* — Sage Patent Group

(57) ABSTRACT

A method is for receiving, by a user equipment (UE), one or more physical downlink control channels (PDCCHs) from a wireless network using a selectable portion of a plurality of available resources. The method comprises determining one or more PDCCH reception quality metrics for each of a plurality of candidate subsets of the available resources, selecting a particular candidate subset based on the determined PDCCH reception quality metrics, and monitoring for PDCCH transmissions using only the selected subset of resources. A UE and computer program therefor are also disclosed.

19 Claims, 10 Drawing Sheets

(51) Int. Cl.
  *H04W 72/02* (2009.01)
  *H04W 72/0446* (2023.01)
  *H04W 72/23* (2023.01)
  *H04W 72/541* (2023.01)
  *H04W 72/542* (2023.01)

(52) U.S. Cl.
  CPC ......... *H04W 72/23* (2023.01); *H04W 72/541* (2023.01); *H04W 72/542* (2023.01)

(56) References Cited

U.S. PATENT DOCUMENTS

| | | | |
|---|---|---|---|
| 2013/0244665 A1 | 9/2013 | Clevorn et al. | |
| 2014/0036867 A1* | 2/2014 | Murai | H04W 36/0011 370/331 |
| 2014/0050191 A1 | 2/2014 | Kim et al. | |
| 2014/0071844 A1* | 3/2014 | Mujtaba | H04W 52/243 370/252 |
| 2015/0110031 A1* | 4/2015 | Takeda | H04W 72/23 370/329 |
| 2015/0282129 A1* | 10/2015 | Takeda | H04B 7/0452 370/329 |
| 2015/0341097 A1* | 11/2015 | Yang | H04B 7/0639 370/329 |
| 2016/0014748 A1 | 1/2016 | Kim et al. | |
| 2017/0033901 A1* | 2/2017 | Tavildar | H04W 72/27 |
| 2017/0164346 A1* | 6/2017 | Ohwatari | H04L 5/0053 |
| 2017/0359200 A1 | 12/2017 | Almalfouh et al. | |

OTHER PUBLICATIONS

Samsung, "On PDCCH-based power saving signal/channel", 3GPP TSG RAN WG1 RAN1 Meeting #96bis, Apr. 8-12, 2019, pp. 1-7, Xi'an, China, R1-1904461.

Qualcomm Incorporated, "Ue Adaptation to the Traffic and UE Power Consumption Characteristics", 3GPP TSG-RAN WG1 Meeting #94bis, Oct. 8-12, 2018, pp. 1-17, Chengdu, China, R1-1811282.

Huawei et al., "Power consumption reduction based on time/frequency/antenna adaptation", 3GPP TSG-RAN WG1 Meeting #94bis, Oct. 8-12, 2018, pp. 1-15, Chengdu, China, R1-1810154.

Apple Inc., "UE-assisted Approaches for UE Power Saving", 3GPP TSG-RAN WG1 Meeting #94bis, Oct. 8-12, 2018, pp. 1-6, Chengdu, China, R1-1811128.

First Office Action dated Mar. 21, 2024 for Chinese Patent Application No. 202080050338.1, 11 pages (includes English translation).

* cited by examiner

ROBUST UE-AUTONOMOUS ANTENNA ADAPTATION

TECHNICAL FIELD

The present invention generally relates to wireless communication networks, and particularly relates to improvements to user equipment (UE) energy consumption during idle-mode operation.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (network node), such as network nodes 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the network nodes, such as network nodes 105, 110, and 115. The network nodes in the E-UTRAN communicate with each other via the X1 interface, as shown in FIG. 1. The network nodes also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Protocol (IP) data packets between the UE and the EPC, and serves as the local mobility anchor for the data bearers when the UE moves between network nodes, such as network nodes 105, 110, and 115.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier spacing (SCS), a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that $VRBn_{VRB}$ corresponds to $PRBn_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

Generally speaking, a physical channel corresponds to a set of REs (or PRBs) carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs. The number of CCEs aggregated for transmission of a PDCCH to a particular UE is referred to as "aggregation level" (or "AL" for short).

FIG. 4 illustrates one exemplary manner in which the CCEs and REGs can be mapped to a physical resource, e.g., PRBs. As shown in FIG. 3B, the REGs comprising the CCEs of the PDCCH can be mapped into the first three symbols of a subframe, whereas the remaining symbols are available for other physical channels, such as the PDSCH which carries user data. In the exemplary arrangement of FIG. 4, each of the REGs comprises four REs, which are represented by the small, dashed-line rectangles. Although two CCEs are shown in FIG. 4, the number of CCEs may vary depending on the required PDCCH capacity, which can be determined based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

To support mobility (e.g., handover or reselection) between cells and/or beams, a UE can perform periodic cell search and measurements of signal power and quality (e.g., reference signal received power, RSRP, and Reference signal received quality, RSRQ) in both Connected and Idle modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN reference signals, UE-specific Reference Signal (DM-RS) associated with PDSCH, Demodulation Reference Signal (DM-RS) associated with EPDCCH or MPDCCH, Positioning Reference Signal (PRS), and CSI Reference Signal (CSI-RS).

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols.

In Rel-15 NR, a UE can be configured with up to four carrier bandwidth parts (BWPs) in the DL with a single DL carrier BWP being active at a given time. A UE can be configured with up to four carrier BWPs in the UL with a single UL carrier BWP being active at a given time. If a UE is configured with a supplementary UL, the UE can be configured with up to four additional carrier BWPs in the supplementary UL, with a single supplementary UL carrier BWP being active at a given time.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at any given time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. Various SCS values (referred to as numerologies) are supported in NR and are given by $\Delta f=(15 \times 2^{\alpha})$ kHz where $\alpha \in (0,1,2,3,4)$. $\Delta f=15$ kHz is the basic (or reference) subcarrier spacing that is also used in LTE. The slot length is inversely related to subcarrier spacing or numerology according to $\frac{1}{2^{\alpha}}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^{\alpha}*180$ kHz.

Table 1 below summarizes supported NR transmission numerologies and associated parameters. Different DL and UL numerologies can be configured by the network.

TABLE 1

| μ | $\Delta f = 2^{\mu} \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

An NR slot can include 14 OFDM symbols for normal cyclic prefix and 12 OFDM symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). Even so, mini-slots are not service-specific and can be used for eMBB, etc.

FIG. 6B shows an exemplary NR slot structure with 15-kHz subcarrier spacing (e.g., μ=0 in Table 1). Within an NR slot, the PDCCH channels are confined to a particular number of symbols and a particular number of subcarriers, where this region is referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET is made up of multiple RBs (i.e., multiples of 12 REs) in the frequency domain and either one, two, or three OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, so long as the same precoder used for the REGs by the transmitter. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3, or 6 REGs.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. On the other hand, not using interleaving can be beneficial when available knowledge of the channel facilitates the use of a precoder in a particular part of the spectrum, thereby improving the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, which RBs will carry that data. A UE first detects and decodes DCI and, if successful, then decodes the corresponding PDSCH based on the decoded DCI. Likewise, DCI can include UL grants that indicate which UE is scheduled to transmit data in that slot, which RBs will carry that data. A UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc. In addition to grants or assignments, DCI can also carry an indication of modulation and coding scheme (MCS) to be used for DL or UL transmissions.

Similarly, in NR, UCI (Uplink Control Information) is carried by PUCCH. UCI can include, but is not necessarily limited to, HARQ (Hybrid Automatic Repeat Request) feedback, CSI (Channel State Information), and SR (Scheduling Request). Currently there are five different PUCCH formats (0-4) defined for carrying different types of UCI, where the sizes of the various formats range from one to 14 OFDM symbols. The various PUCCH formats are further defined in 3GPP TS 38.211.

In general, a UE determines its frequency-domain RB assignment for PUSCH or PDSCH based on the resource allocation field in the detected DCI carried in PDCCH. In NR, two frequency resource allocation schemes, type 0 and type 1, are supported for PUSCH and PDSCH. The type to use for a particular PUSCH/PDSCH transmission can be defined by an RRC-configured parameter or indicated directly in the corresponding DCI or UL grant in RAR (for which type 1 is used). The RB indexing for uplink/downlink type 0 and type 1 resource allocation is determined within the UE's active carrier bandwidth part, and the UE shall (upon detection of PDCCH intended for the UE) determine first the uplink/downlink carrier bandwidth part and then the resource allocation within the carrier bandwidth part.

Monitoring and reception of PDCCH constitutes a large portion of a UE's total energy consumption. Typically, a UE is not scheduled in most PDCCH occasions that it monitors and, as such, the energy used for PDCCH reception does not contribute to useful data transfer. As such, it is desirable to minimize energy consumed for PDCCH monitoring and reception. On the hand, this energy consumption can increase significantly if the UE uses multiple antennas and receiver chains to monitor PDCCH, e.g., to improve performance. In many cases, however, the UE does not know in advance whether multiple antennas and receiver chains will be needed for proper operation.

SUMMARY

Embodiments of the present disclosure provide specific improvements to communication between user equipment (UE) and network nodes in a wireless communication network, such as by facilitating solutions to the exemplary problems described above.

Some exemplary embodiments of the present disclosure include methods and/or procedures for receiving a physical downlink control channel (PDCCH) from a wireless network using a selectable portion of available resources. The exemplary methods and/or procedures can be performed by a user equipment (UE, e.g., wireless device, IoT device, modem, etc. or component thereof) in communication with a network node (e.g., base station, gNB, en-gNB, etc., or component thereof) in the wireless network.

The exemplary methods and/or procedures can include determining one or more PDCCH reception quality metrics for each of a plurality of candidate subsets of the available resources. In various embodiments, the available resources can include one or more of the following: antennas and receive chains; reception frequency bandwidth; and reception time duration. In such embodiments, the candidate subsets can be different combinations of antennas and receive chains, different sub-bandwidths, different combinations of ODFM symbols, or a combination thereof.

The exemplary methods and/or procedures can also include selecting a particular candidate subset based on the determined PDCCH reception quality metrics. In some embodiments, selecting the particular candidate subset can also be based on a duration between PDCCH reception and subsequent reception of a physical downlink shared channel (PDSCH) associated with the PDCCH. In some embodiments, selecting the particular candidate subset can also be based on the robustness and/or reliability of the respective PDCCH reception quality metrics as indicated by, e.g., their amount of variation.

The exemplary methods and/or procedures can include the operations of block 830, where the UE can monitor for PDCCH transmissions using only the selected subset of resources. For example, the UE will collect PDCCH samples only using the reception subset, while other resources (e.g., antennas and receive chains) may be deactivated during PDCCH monitoring, thereby reducing the UE's energy consumption associated with PDCCH monitoring.

In some embodiments, the monitoring for PDCCH transmissions using only the selected subset of resources can be performed during first PDCCH occasions. In such embodiments, the exemplary methods and/or procedures can also include the determine, for one or more second PDCCH occasions, respective PDCCH reception quality metrics for each of the plurality of candidate subsets. In such embodiments, the exemplary methods and/or procedures can also include selecting one of the following based on the PDCCH reception quality metrics determined for the second PDCCH occasions: a further candidate subset different than the particular candidate subset, or all available resources.

Other exemplary embodiments include user equipment (e.g., UE, wireless devices, IoT devices, or components thereof, such as a modem) configured to perform operations corresponding to various ones of the exemplary methods and/or procedures described above. Other exemplary embodiments include non-transitory, computer-readable media storing program instructions that, when executed by at least one processor, configure such network nodes or such UEs to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

Figure 1:
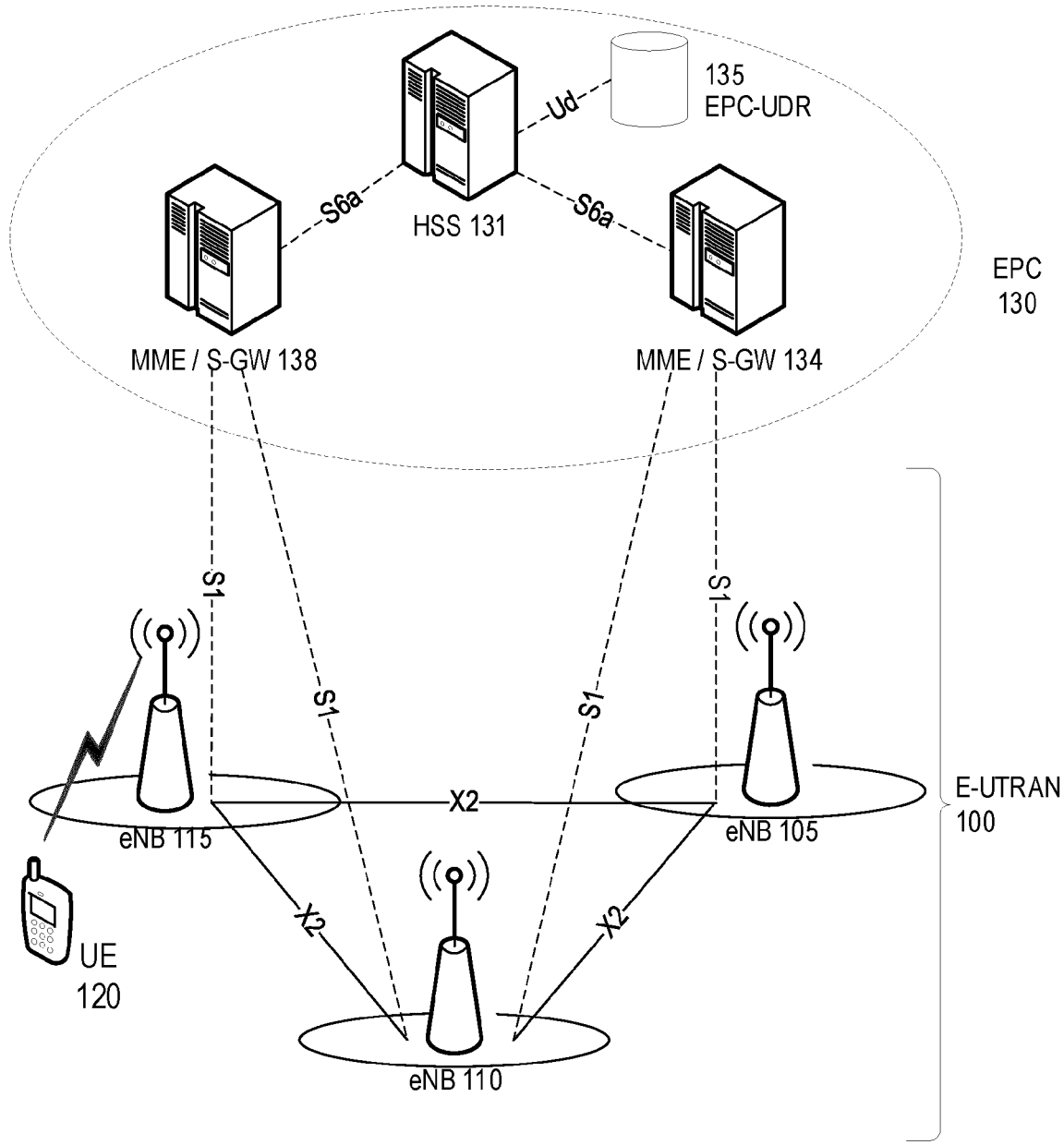
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
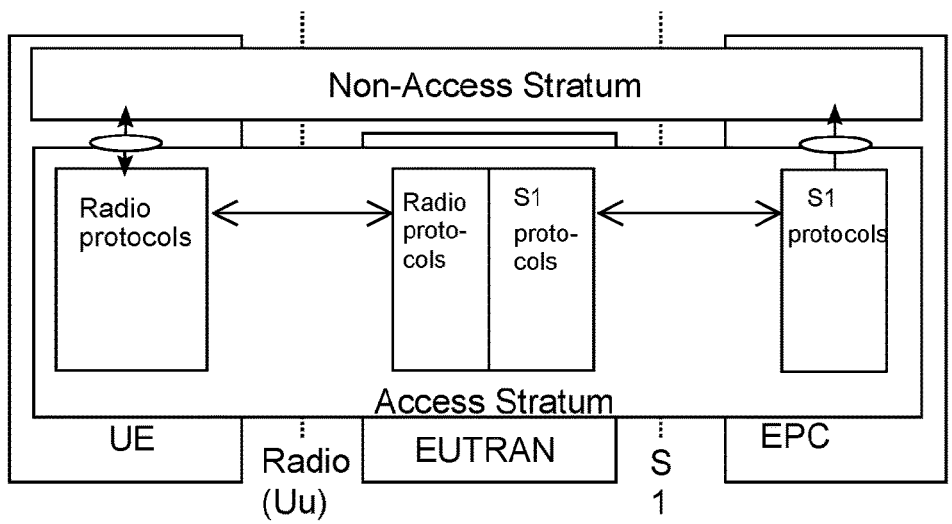
FIG. 2A is a high-level block diagram of an exemplary E-UTRAN architecture in terms of its constituent components, protocols, and interfaces.
Figure 2B:
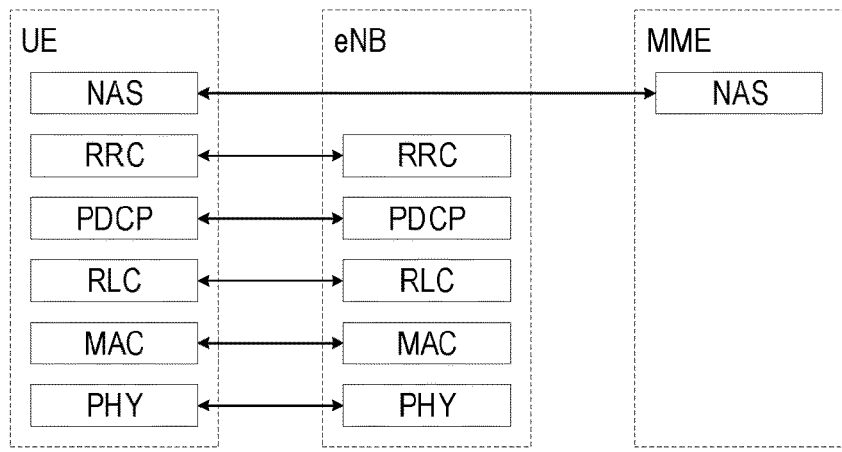
FIG. 2B is a block diagram of exemplary protocol layers of the control-plane portion of the radio (Uu) interface between a user equipment (UE) and the E-UTRAN.
Figure 2C:
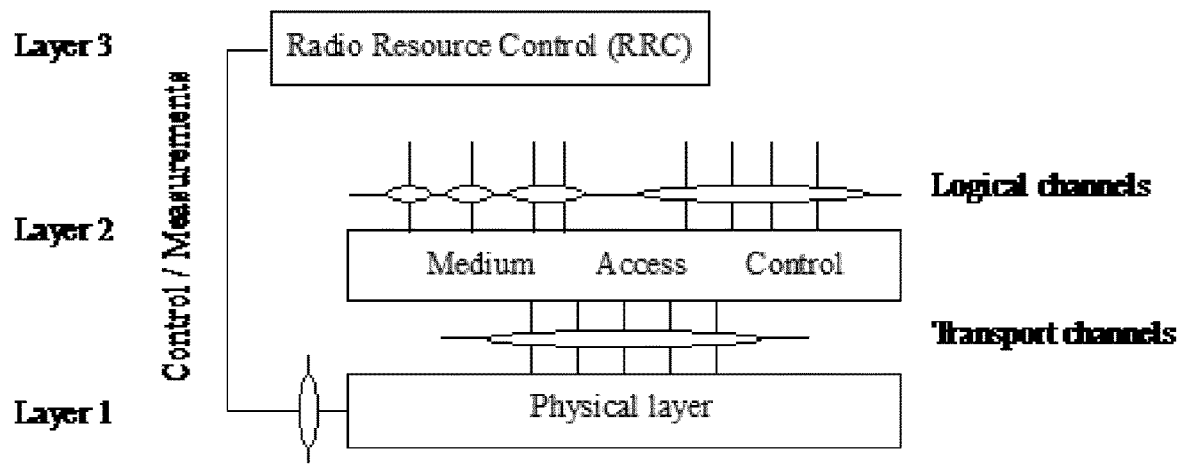
FIG. 2C is a block diagram of an exemplary LTE radio interface protocol architecture from the perspective of the PHY layer.
Figure 3A:
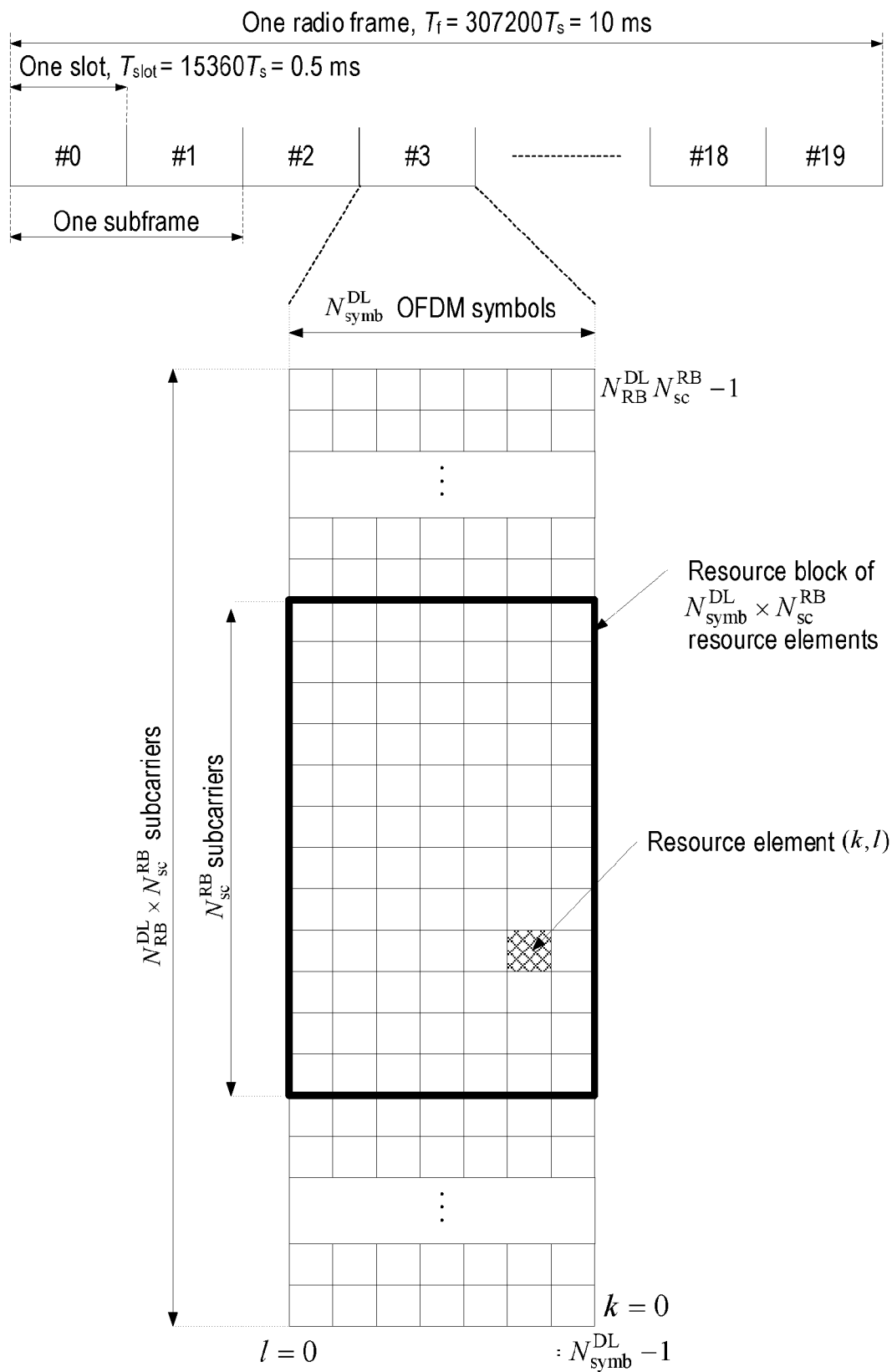
FIGS. 3A and 3B are block diagrams, respectively, of exemplary downlink and uplink LTE radio frame structures used for frequency division duplexing (FDD) operation.
Figure 3B:
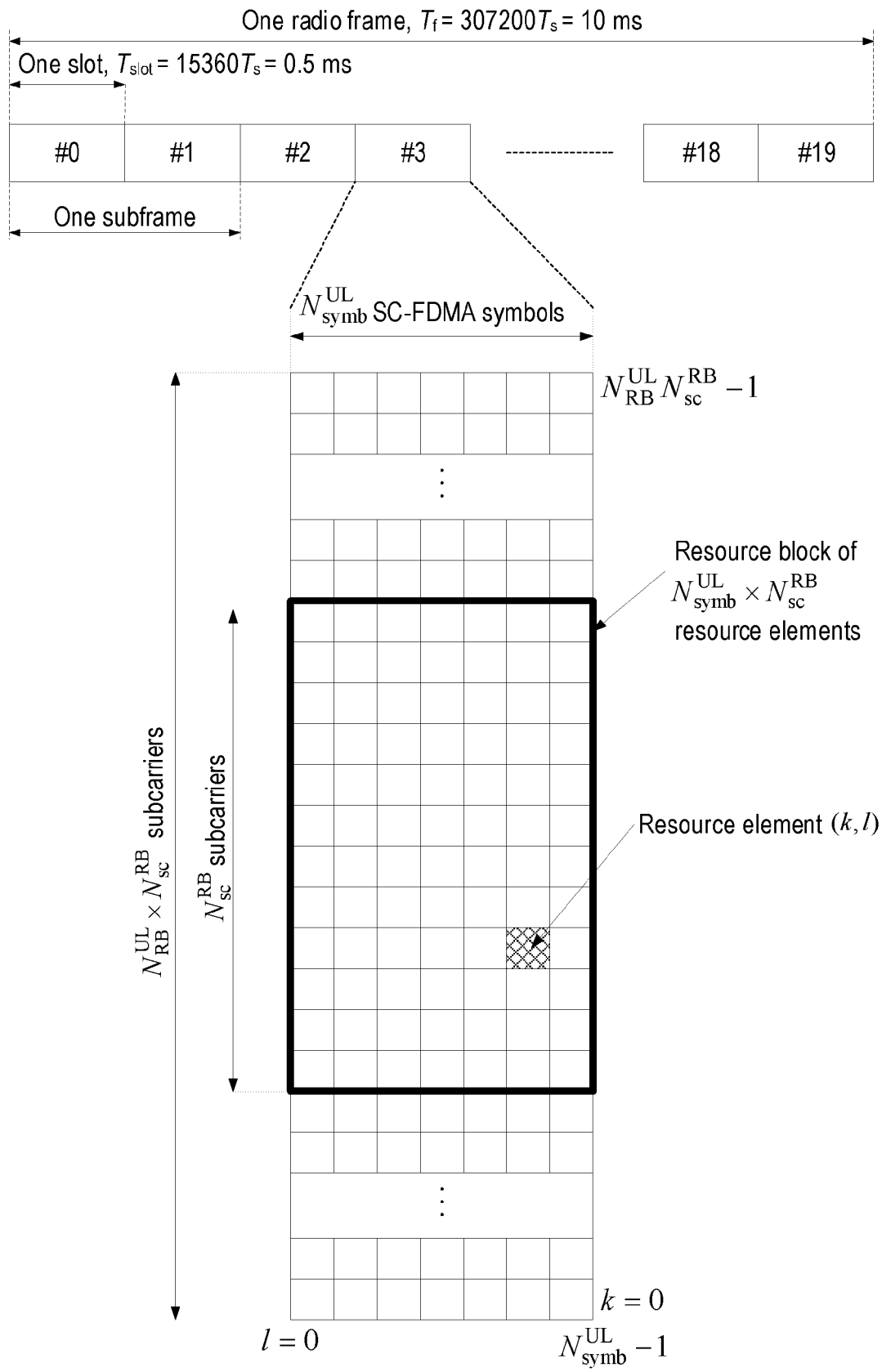
Figure 4:
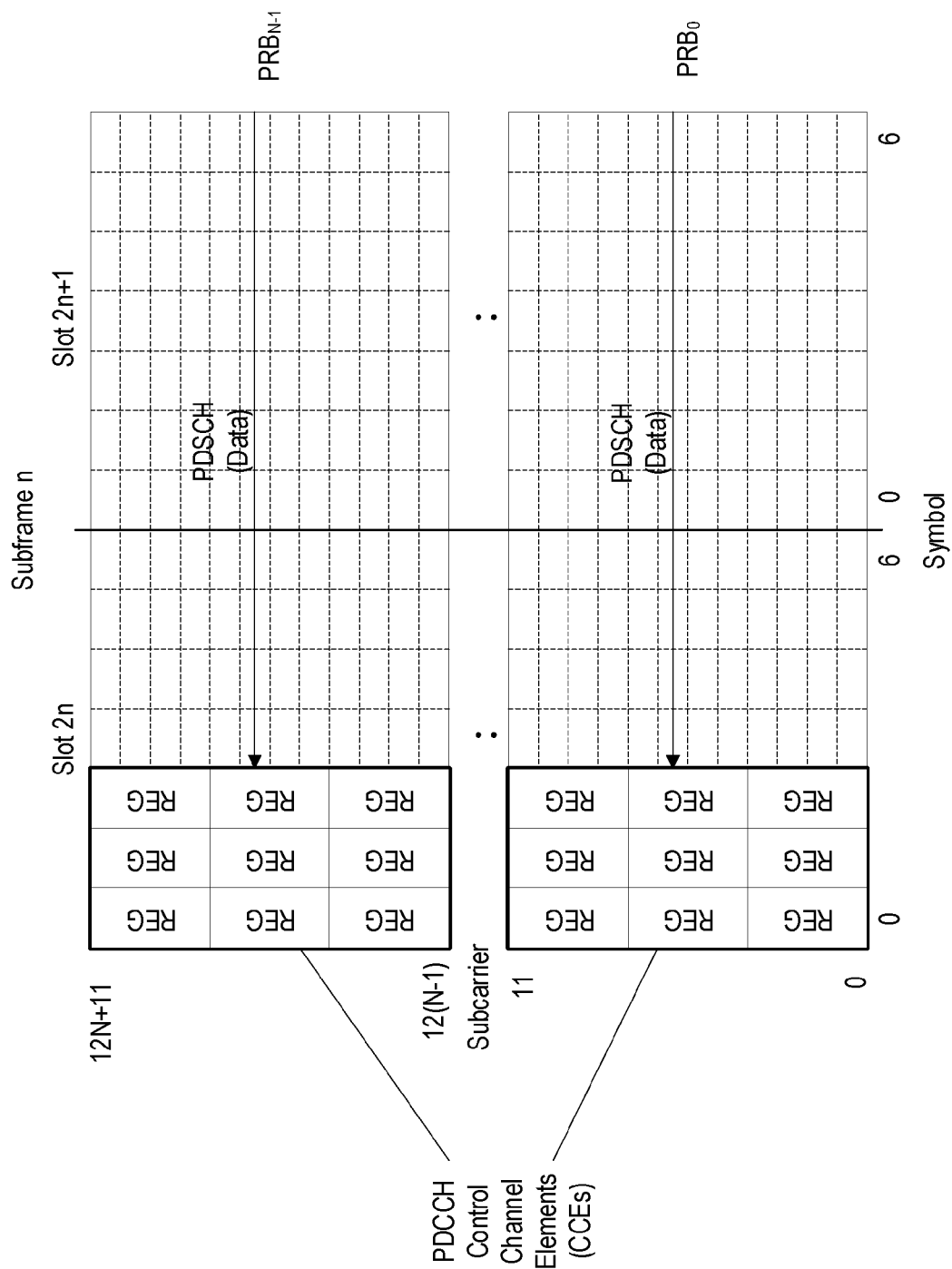
FIG. 4 shows an exemplary manner in which the CCEs and REGs can be mapped to a physical resource.

As briefly mentioned above, monitoring and reception of PDCCH constitutes a large portion of a UE's total energy consumption. Typically, a UE is not scheduled in most PDCCH occasions that it monitors and, as such, the energy used for PDCCH reception does not contribute to useful data transfer. This energy consumption can increase significantly if the UE uses multiple antennas and receiver chains to monitor PDCCH, e.g., to improve performance. In many cases, however, the UE does not know in advance whether multiple antennas and receiver chains will be needed for proper operation. This is discussed in more detail below.

Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity gains against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can provide diversity gains and also shape the antenna beam in the direction of the target receiver and/or transmitter.

In other exemplary configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

Briefly, MIMO operation can be described mathematically as follows. A symbol vector s carrying r information symbols is multiplied by an $N_T \times r$ precoder matrix W, which serves to distribute the transmit energy in a subspace of the $N_T$-dimensional vector space, corresponding to $N_T$ antenna elements. Each of the r symbols in s corresponds to a "layer," and r is referred to as the transmission "rank." In this way, spatial multiplexing is achieved since multiple symbols can be transmitted simultaneously over the same time/frequency resource element (TFRE). The number of symbols r is typically adapted to suit the current channel properties. To correctly receive an r-layer ("full rank") signal, a receiver must use at least r independent antenna elements.

Spatial multiplexing can be utilized in various ways. For example, single-user MIMO (SU-MIMO) involves spatially multiplexing two or more layers to a single UE. Alternately, multi-user MIMO (MU-MIMO) involves spatially multiplexing two or more layers to two or more UEs, with each UE receiving one or more layers. In either case, however, a base station transmitter must employ some type of MIMO precoding to be able to utilize its antenna arrays to achieve these performance gains. The base station can derive the precoder matrix W based on knowledge of the channel from each transmit antenna to each UE receive antenna.

For example, this can be done by the receiver (e.g., UE) measuring the amplitude and phase of a known transmitted data symbol (e.g., a reference signal) and sending these measurements to the transmitter (e.g., base station) as "channel state information" (C SI). The known reference signals used to estimate CSI are transmitted in association with the spatially multiplexed data. As such, RS measurements provide an accurate assessment of the channel used to transmit the spatially multiplexed data symbols.

CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

Figure 7:
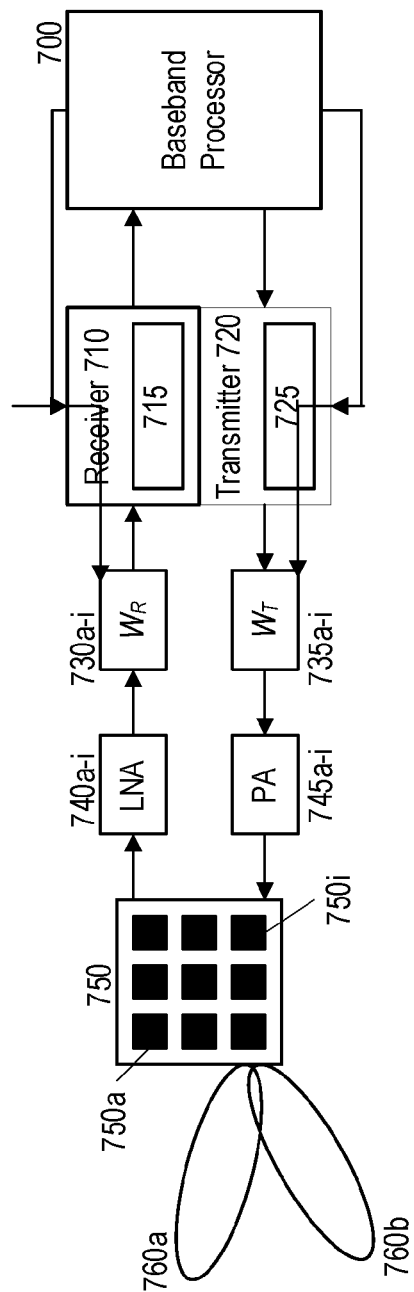
FIG. 7 shows a block diagram of an exemplary transceiver apparatus and/or device according to various exemplary embodiments of the present disclosure.

FIG. 7 shows a block diagram of an exemplary multi-antenna transceiver apparatus and/or device according to various exemplary embodiments of the present disclosure. For example, the exemplary transceiver apparatus can be a component of a UE or wireless device, including those described below in relation to other figures. In such an exemplary application, the transceiver apparatus shown in FIG. 7 can provide beamforming, diversity gains, and spatial multiplexing in the manner described above.

The exemplary apparatus shown in FIG. 7 can also include, e.g., an antenna array 750 that can comprise a plurality of individual antenna elements arranged in a particular pattern, such as, e.g., exemplary antenna elements 750a to 750i arranged in an exemplary 3-by-3 grid. In some exemplary embodiments, the antenna array 750 can be arranged as an M-by-N array of elements, where M≥1 and N>1. In some exemplary embodiments, the antenna elements 750a to 750i can be arranged in a rectangular grid with equal spacing in one or both dimensions; however, other exemplary arrangements of the elements comprising the array are possible and are within the scope of the present disclosure, including non-grid and/or irregular arrangements. In addition, each element of the antenna array 750 can have various physical forms including dipole, patch, cross dipole, inverted F, inverted L, helix, Yagi, rhombic, lens, and/or any another type of antenna topology known to persons of ordinary skill.

Elements 750a to 750i can utilize various polarization patterns known to persons of ordinary skill, including horizontal, vertical, circular, and cross polarization. For example, elements 750a to 750i—as well as their arrangement in the array 750—can be designed and/or configured especially for the particular operating frequency (e.g., 5 GHz, 10 GHz, 300 GHz, etc.) and device (e.g., mobile or fixed-location terminal, cellular phone, handset, laptop, tablet, etc.) in which the exemplary apparatus of FIG. 7 can be used.

According to certain exemplary embodiments of the present disclosure, the antenna elements 750a to 750i can be used for receiving and/or transmitting signals in combination with, respectively, other receiving and transmitting circuity comprising the exemplary apparatus. The receiving circuity can comprise a plurality of low-noise amplifiers (LNAs) 740a through 740i, each of which can amplify a signal received from a corresponding antenna element 750a through 750i. The exemplary apparatus can further comprise a plurality of receive gain/phase controls 730a through 730i, each of which can receive a signal output from a corresponding (LNAs) 740a through 740i. In some exemplary embodiments, the receive gain/phase control 730 can comprise a receiver beamformer that can be controlled by, e.g., one or more processors 700. The outputs of the receive gain/phase controls 730a through 730i are provided to a receiver block 710, which can comprise a receive conversion circuit 715. The inputs to block 710 can be at a particular radio frequency (RF), in which case block 710 can comprise circuitry configurable to translate the signals to an intermediate frequency (IF). Nevertheless, the skilled person can readily comprehend that RF-to-IF conversion can alternately occur prior to the signals reaching receiver block 710. As indicated herein, references to "processor" should be understood to mean one or more processors, including one or more computer processors, signal processors, etc.

The output of circuit 715 can comprise one or more streams of digitized samples that are provided to a baseband processor 700, which can provide one or more receiver control signals for controlling various operational aspects of, e.g., receive gain/phase controls 730a through 730i, receive conversion circuit 715, etc. Similarly, processor 700 can provide one or more streams of digitized samples to transmitter block 720, which can comprise a transmit conversion block 725. The output of block 720 (e.g., the output of transmit conversion block 725) can comprise a plurality of analog signals, each of which can be at RF or IF, as described above for the receiving circuitry. Each of the analog signals output by transmitter block 720 can be applied to a corresponding transmit gain/phase control 735a through 735i. Processor 700 can also provide one or more transmitter control signals for controlling various operational aspects of, e.g., transmit gain/phase controls 735a through 735i, transmit conversion block 725, etc. In some exemplary embodiments, transmit gain/phase control 735 can comprise a transmit beamformer that can be controlled by, e.g., processor 700. Each of the signals output by transmit gain/phase control 735a through 735i can be applied to a corresponding transmit power amplifier (PA) 745a through 745i. The amplified outputs of the PAs can be applied to respective corresponding antenna array elements 750a through 750i.

Figure 5:
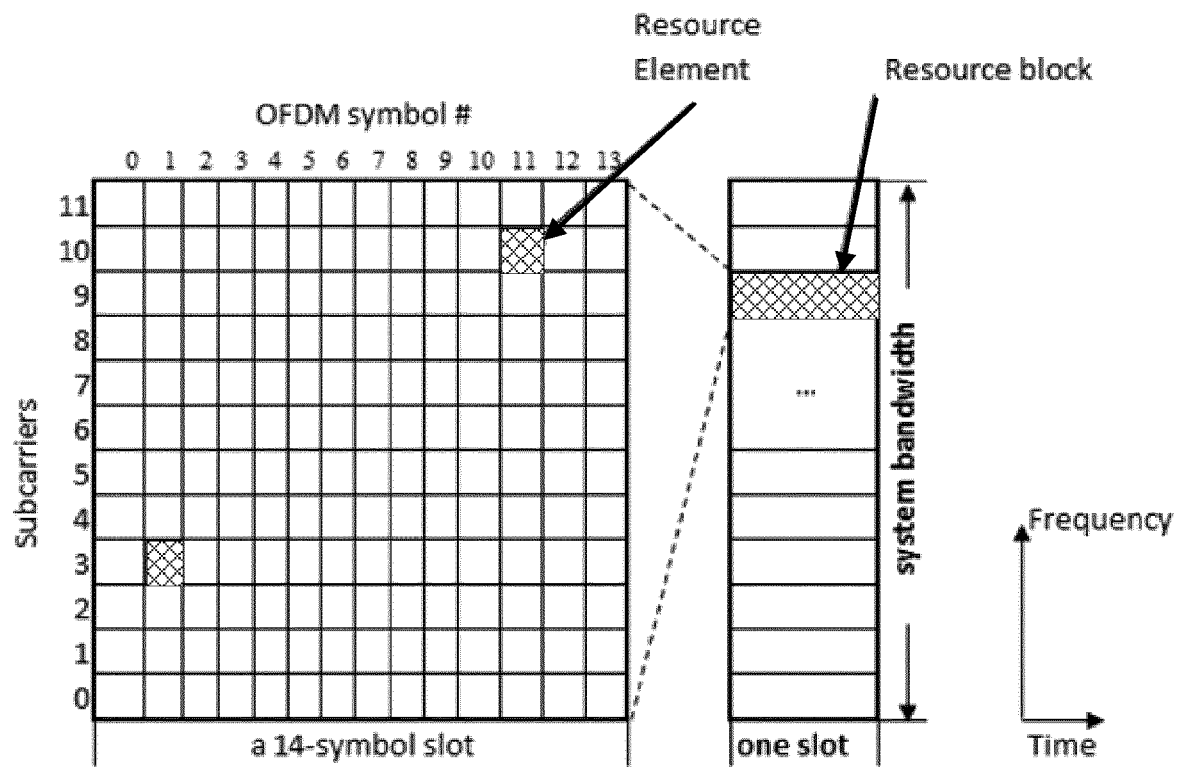
FIG. 5 shows an exemplary time-frequency resource grid for an NR slot.
Figure 6A:
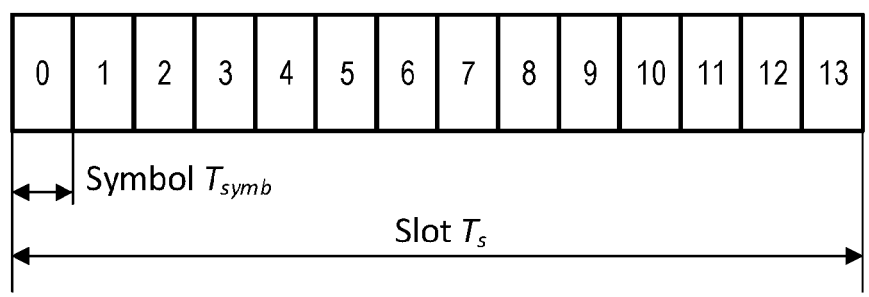
FIG. 6A shows an exemplary NR slot configuration of 14 OFDM symbols.
Figure 6B:
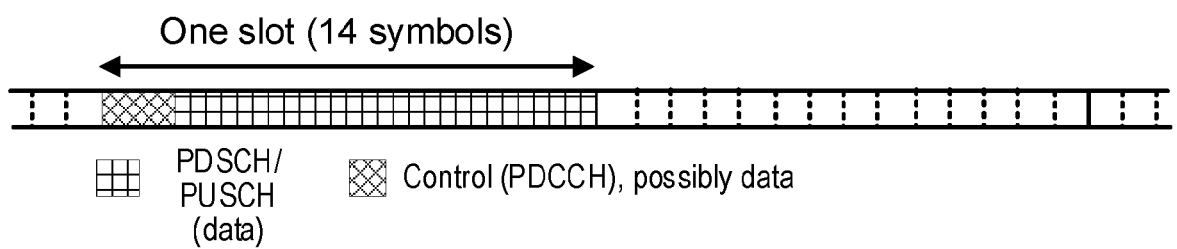
FIG. 6B shows an exemplary two-symbol NR minislot.

In some exemplary embodiments, processor 700 can utilize a direction-of-arrival estimate or other available information to determine appropriate weights (e.g., $W_R$ or $W_T$) to cause the antenna array 750 to produce one or more beam patterns directed to a particular angular direction relative to the antenna array. For example, as shown in FIG. 5, by applying the appropriate weights (e.g., $W_R$ or $W_T$) to the signals received from the antenna elements 750a through 750i, the antenna array 750 can capture signals and/or multipath components that are incident in the directions of arrival corresponding to beams 760a and 760b while rejecting signals and/or multipath components that are incident other directions of arrival. In other exemplary embodiments, the weights can comprise and/or incorporate a precoder matrix that facilitates directing one or more beams directed to particular angular directions, e.g., for a beam sweep or to another device (e.g., base station) located at a specific position.

Processor 700 can program and/or configure receive gain/phase controls 730 and/or transmit gain/phase controls 735 with weights (e.g., $W_R$ or $W_T$, respectively) corresponding to the desired angular direction. Processor 700 can determine weights using various beam-steering or beam-forming algorithms know to persons of ordinary skill, including parametric algorithms and codebook-based algorithms. According to various exemplary embodiments, receive gain/phase controls 730 and/or transmit gain/phase controls 735 can comprise one or more programmable amplifiers that modifies the amplitude and/or phase of the signals (e.g., at RF or IF) from the array elements 750a through 750i. When no gain or phase adjustment of the signals to/from array elements 750a through 750i is required, the processor 700 can program the respective elements of controls 730 and/or 735 to unity gain and zero phase.

In further exemplary embodiments, processor 700 can comprise one or more general-purpose microprocessors, one or more special-purpose microprocessors, one or more digital signal processors (DSPs), one or more application specific integrated circuits (ASICs), and/or one or more other types of computer arrangement known to persons of ordinary skill in the art. Furthermore, processor 700 can be programmable and/or configured to perform the functions described herein by executable software code stored in an accessible memory or other type of computer-readable medium. In some exemplary embodiments, memory and/or other computer-readable medium (e.g., including RAM, ROM, memory stick, floppy drive, memory card, etc.) can be permanently programmed and/or configured with such executable software code, while in other exemplary embodiments, the memory or computer-readable medium can have the executable software code downloaded and/or configured.

More generally, persons of ordinary skill in the art will recognize that various protocols and other functions of the exemplary device shown in FIG. 7 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware. For example, such various combinations can be utilized to execute various communication protocols specified by 3GPP and improvements described herein.

In June 2018, 3GPP has started a new study-item titled "User-Equipment (UE) Power Savings for NR." One of the objectives of this study item is to assess the energy consumption of a UE operating in a NR network. Specifically, from a PHY perspective, the goal is to analyze the various layer-1 (L1) features that can result in increased UE energy consumption, and to propose solutions to reduce such energy consumption. Note that the terms "energy consumption" and "power consumption" are used interchangeably herein with the understanding that power is energy per unit time.

One promising area for achieving improvements in UE power consumption is in the UE monitoring of the PDCCH. As mentioned above, PDCCH carries control information from network to UE, including system information, downlink scheduling grants, uplink scheduling grants, downlink/uplink resources for UE to use, slot formats, etc. PDCCH transmission is always transmitted in a single layer, even if the PDSCH that it schedules has a multi-layer configuration.

The UE energy consumption during PDCCH monitoring can be divided primarily into baseband energy consumption and analog/RF energy consumption. The baseband consumption for PDCCH monitoring involves all baseband processing related to PDCCH decoding. For example, in the context of FIG. 7, this can include the PDCCH-related operations performed by baseband processor 700. Likewise, the RF power consumption relates to all the RF processing required for the reception of the PDCCH signal in the UE device. The RF components include the number of antenna elements used, the power amplifiers, mixers, analog-to-digital converters and filters to name a few. For example, in the context of FIG. 7, this can include antenna elements 750, LNA(s) 740, weight circuits 730, and receiver 710 (including conversion circuit 715).

Typically, the UE must have an independent receive chain for each DL transmission layer that it is capable of receiving. In the context of FIG. 7, each receive chain can include an antenna element (e.g., 750a-i), a corresponding LNA (e.g., 740a-i), and a corresponding weight circuit (e.g., 730a-i). In addition, some portion of receiver 710 (including conversion circuit 715) can be unique to each receive chain, while other portions of receiver 710 can be shared among the various receive chains. Each of these independent receive chains consumes a certain amount of energy when operational. In NR Release-15, UEs can support up to eight DL transmission layers. As such, UEs must have at least eight receive antennas (with corresponding receive chains) to support the reception of eight DL transmission layers. While providing improvements in performance, the larger number of receive chains can also increase UE energy consumption.

Conventionally, PDCCH is transmitted using a single layer and, as such, one antenna suffices for PDCCH reception during most link conditions. Even so, in conventional operation, the UE often uses its full antenna resources for PDCCH monitoring due to the possible need to subsequently receive a full-rank PDSCH transmission scheduled by a PDCCH message. This can be due to delays in activating a receive chain for operation.

In some scenarios, the base station (e.g., LTE eNB or NR gNB) can apply UE-specific PDCCH link adaptation (LA) based on the CSI provided by that UE in relation to PDSCH scheduling. For example, the base station may use a predetermined and/or proprietary mapping to determine the proper UE PDCCH configuration (e.g., format and AL) based on the CSI provided by that UE in relation to the multi-antenna reception of PDSCH. The default assumption (e.g., by the base station) is that UE receives PDCCH with same antenna configuration that was used to generate the previously-reported CSI. In other scenarios, however, the base station may forego UE-specific PDCCH LA, or the UE-specific LA may follow a long-term average link quality rather than short-term fast fading that would be reflected in the UE's CSI reports.

In general, however, the base station's PDCCH LA is relatively coarse, mostly limited to selecting the appropriate DCI format and AL. Furthermore, since PDCCH reception is a prerequisite for robust and efficient PDSCH operation, PDCCH is often transmitted with a deliberately robust MCS (e.g., relatively high AL) to provide additional decoding reliability and/or margin. For UEs near the base station, the resulting margin even for high-rate PDCCH transmissions can be significant.

If the UE sees a good PDCCH link quality, then there is no need for the UE to operate a higher number of antennas since reliable reception of the PDCCH signal can take place with a lower number of antennas and receive chains (e.g., as low as one). In such case, the UE energy consumption for PDCCH monitoring in high-margin scenarios can be reduced significantly. On the other hand, reducing the number of antennas during PDCCH monitoring can lead to PDCCH reception failure if the margin is—or suddenly becomes—insufficient or inadequate. This failure can actually result in increased energy consumption because the UE must continue monitoring until it correctly receives PDCCH. Accordingly, there is a need for a technique whereby the UE can reliably determine the minimum number of receiver resources required to correctly receive PDCCH, thereby reducing, optimizing, and/or minimizing the UE's energy consumption due to PDCCH monitoring.

U.S. Pat. Appl. 62/754,135, which has a common assignee as the present Application, discloses a technique in which the UE can utilize a lookup table to determine the minimum number of antennas required for reliable PDCCH reception, based on PDCCH format and link quality estimates. That technique provides some guidance regarding the number of antennas, but the limited number of input dimensions in the table can be inadequate to account for all channel variations in actual deployments. Furthermore, the technique does not indicate which specific antenna subset maximizes performance in the given scenario.

Accordingly, there is a need to reduce UE power consumption by reducing the antenna configuration for PDCCH monitoring in a wide range of actual deployments, while still providing sufficiently reliable PDCCH reception, thereby facilitating reception of a subsequent (e.g., multi-layer) PDSCH transmission scheduled by a received PDCCH message.

Exemplary embodiments of the present disclosure can address these and other issues, problems, and/or difficulties by providing a flexible mechanism for a UE to make a qualified decision, based on actual reception quality observations, about when and how to reduce its PDCCH monitoring antenna set without compromising PDCCH robustness and incurring losses in PDSCH performance and network resource usage. Such techniques allow the UE to reduce its PDCCH monitoring antenna set to facilitate lower-power operation when a sufficient decoding margin exists, and also provide a safety mechanism by monitoring the current margin. In this manner, such techniques facilitate lower-power operation without compromising PDCCH robustness and without incurring losses in PDSCH performance and resulting network resource usage.

In various embodiments of the present disclosure, a UE can determine PDCCH reception performance (e.g., decoding margin) for various receive antenna configurations based on multiple previous PDCCH reception occasions. Based on such information, the UE can select the most power-efficient antenna subset that provides a sufficient decoding margin, and then use the selected subset for PDCCH monitoring and reception. Furthermore, once in this power-efficient reception mode, the UE can occasionally verify the antenna subset selection based on PDCCH samples collected from all receive antennas.

For example, a UE in the power-efficient reception mode can continue to monitor the PDCCH reception process. If at one or more PDCCH occasions, the UE detects a likely PDCCH but is unable to successfully decoded the likely PDCCH, the UE can take one or more actions. These actions can include performing an antenna subset reselection process and/or exiting the power-efficient mode. For example, if the UE is unable to identify a suitable subset during the reselection process, the UE can exit the power-efficient mode.

In some embodiments, a UE's monitoring of the PDCCH reception process can include PDCCH transmissions targeting other UEs. Since each PDCCH transmission includes cyclic redundancy code (CRC) that is scrambled by an identifier associated with the target UE (e.g., C-RNTI), the UE is unable to verify the CRC field in these transmissions. In such case, the UE's criteria for "successful decoding" can include, or be based on, a soft decoding metric exceeding a threshold, or similar criteria that are not based on success or failure of CRC verification.

In general, various embodiments operate under the principle that the network's PDCCH LA for a given UE is consistent over time, with any changes being slowly rather than suddenly. Even so, embodiments can detect such changes that could be detrimental to PDCCH robustness and, if necessary, return to more robust but less power-efficient PDCCH monitoring mode (e.g., using more and/or all available receive antennas). In this manner, various embodiments facilitate UE antenna adaptations without any addition signaling from the network, which will be referred to herein as "UE-autonomous antenna adaptation."

Figure 8:
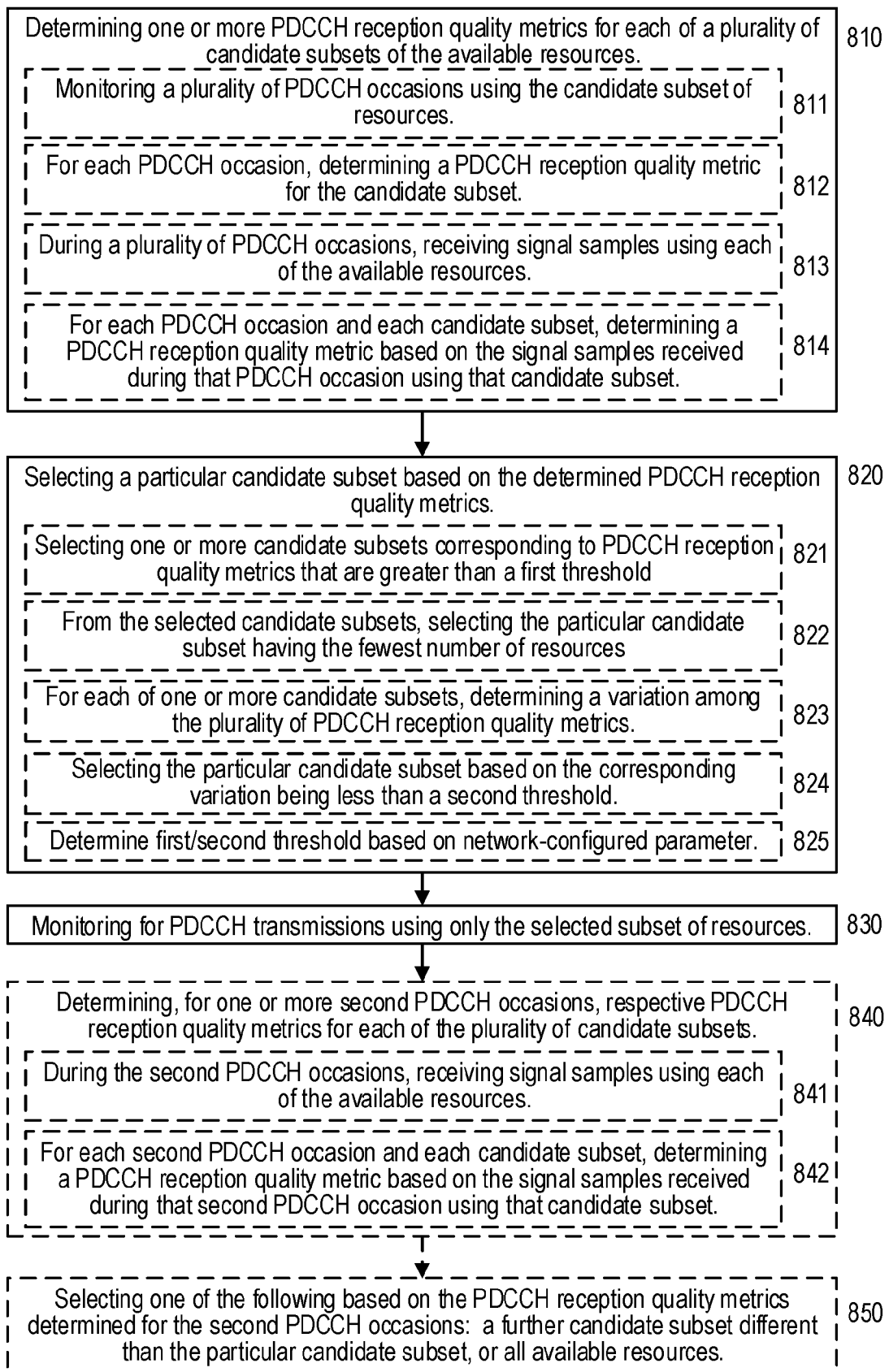
FIG. 8 shows a flow diagram of an exemplary method and/or procedure performed by a user equipment (UE, e.g., wireless device, IoT device, etc.), according to various exemplary embodiments of the present disclosure.

FIG. 8 shows a flow diagram of an exemplary method and/or procedure for receiving a physical downlink control channel (PDCCH) from a wireless network using a selectable portion of available resources, according to various exemplary embodiments of the present disclosure. The exemplary method and/or procedure can be performed by a user equipment (UE, e.g., wireless device, IoT device, modem, etc. or component thereof) in communication with a network node (e.g., base station, gNB, en-gNB, etc., or component thereof) in the wireless network. For example, the exemplary method and/or procedure shown in FIG. 8 can be implemented in a UE or wireless device configured according to other figures described herein. Although FIG. 8 shows blocks in a particular order, this order is merely exemplary, and the operations of the exemplary method and/or procedure can be performed in a different order than shown and can be combined and/or divided into blocks having different functionality than shown. Optional blocks or operations are indicated by dashed lines.

The exemplary method and/or procedure can include the operations of block 810, where the UE can receive a configuration associated with one or more PDCCHs. The configuration can include, for each PDCCH, a search space comprising a plurality of PDCCH candidates. In some embodiments, each PDCCH candidate can be associated with at least one of the following: a format and a location in the search space. In some embodiments, the received configuration can also include at least one slot offset between PDCCH transmission and a subsequent transmission of a physical downlink shared channel (PDSCH).

In some embodiments, the exemplary method and/or procedure can include the operations of block 810, where the UE can determine one or more PDCCH reception quality metrics for each of a plurality of candidate subsets of the available resources. In various embodiments, the available resources can include one or more of the following: antennas and receive chains; reception frequency bandwidth; and reception time duration. In such embodiments, the candidate subsets can be different combinations of antennas and receive chains, different sub-bandwidths, different combinations of ODFM symbols, or a combination thereof.

In some embodiments, the operations of block 810 can include the operations of sub-block 811, where the UE can monitor a plurality of PDCCH occasions using the candidate subset of resources associated. Such embodiments can also include the operations of sub-block 812, where the UE can, for each PDCCH occasion, determine a PDCCH reception quality metric for the candidate subset. In other words, the UE can perform the operations of sub-blocks 811-812 for each candidate subset of resources.

In some embodiments, monitoring the plurality of PDCCH occasions using the candidate subset of resources (sub-block 811) can include receiving first PDCCH transmissions directed to the UE, and determining the PDCCH reception quality metric for the first PDCCH transmissions (sub-block 812) can include verifying a CRC field, in each received first PDCCH transmission, based on an identifier associated with the UE. For example, the identifier can be the C-RNTI assigned to the UE, which can be used to scramble the CRC.

In some embodiments, verifying the CRC field can include verifying the CRC field in each received first PDCCH transmission a plurality of times, with each verification of the CRC field being associated with a different amount of degradation of the received PDCCH transmission. In such embodiments, determining the PDCCH reception quality metric for each first PDCCH transmission (sub-block 812) can include selecting the maximum amount of degradation under which the verification of the CRC field is successful.

In some embodiments, monitoring the plurality of PDCCH occasions using the candidate subset of resources (sub-block 811) can include receiving second PDCCH transmissions directed to other UEs, and determining the PDCCH reception quality metric for the second PDCCH transmissions (sub-block 812) can include computing a decoding metric without verification a CRC field associated with each received second PDCCH transmission. Various exemplary decoding metrics are discussed below. In some embodiments, the second PDCCH transmissions can have at least one of the following parameters in common with the first PDCCH transmissions: aggregation level (AL) or estimated received power.

In some embodiments, the operations of block 810 can include the operations of sub-block 813, where the UE can, during a plurality of PDCCH occasions, receive signal samples using each of the available resources. For example, the UE can receive signal samples using all available antennas and receive chains. In such embodiments, the operations of block 810 can include the operations of sub-block 814, where the UE can, for each PDCCH occasion and each candidate subset, determining a PDCCH reception quality metric based on the signal samples received during that PDCCH occasion using that candidate subset.

The exemplary method and/or procedure can include the operations of block 820, where the UE can select a particular candidate subset based on the determined PDCCH reception quality metrics. In some embodiments, selecting the particular candidate subset can also be based on a duration between PDCCH reception and subsequent reception of a physical downlink shared channel (PDSCH) associated with the PDCCH.

In some embodiments, the operations of block 820 can include the operations of sub-block 821, where the UE can select one or more candidate subsets corresponding to PDCCH reception quality metrics that are greater than a first threshold. In such embodiments, the operations of block 820 can include the operations of sub-block 822, where the UE can select, from the one or more selected candidate subsets, the particular candidate subset having the fewest number of resources. For example, the UE can select the candidate subset the includes the fewest number of available antennas and receive chains.

In some embodiments, the operations of block 820 can include the operations of sub-block 823, where the UE can, for each of one or more candidate subsets, determine a variation among the plurality of PDCCH reception quality metrics. In such embodiments, the operations of block 820 can include the operations of sub-block 824, where the UE can select the particular candidate subset based on the corresponding variation being less than a second threshold. In this manner, the UE can evaluate the reliability and/or robustness of the selected candidate, as explained in more detail below. In some embodiments, the operations of block 820 can include the operations of sub-block 825, where the UE can determine the first threshold and/or the second threshold based on a parameter configured by the wireless network. For example, various reception- and/or decoding-related parameters can be used as the basis for this determination.

The following explanation provides additional details and/or embodiments related to the operations of blocks 810-820 and their sub-blocks.

In some embodiments, a UE can collect PDCCH samples with all M available receive antennas and can perform tentative demodulation/decoding with candidate subsets of antennas, where a subset may consist of any n available antennas, $1<=n<M$. The tentative decoding may be performed in the background, in parallel with regular operation. It may be performed over a predetermined number of PDCCH reception occasions, preferably more than one, or over a predetermined time interval.

Although the tentative decoding of multiple candidate subsets and decoding margin hypotheses can be considered a processing overhead, such processing is not time-critical and can be performed using stored signal samples or demodulated symbol/bit estimates during periods when the UE is not using all its computational capacity for other tasks, such as PDSCH decoding. In general, additional baseband processing has a relatively minor impact on total operating power—the main cost lies in sample collection, which exemplary embodiments reduce, optimize, and/or minimize. Since typical PDCCH/DCI code block sizes are small, the resulting overhead may be kept low.

In some embodiments, decoding success (or failure) can be used as a PDCCH reception quality metric of a candidate subset. In one embodiment, the UE may use PDCCH transmission targeting the UE (i.e., scrambled with its C-RNTI) in which case the decoding success may be determined by a CRC check.

In some embodiments, the UE can use any PDCCH transmission—even when the C-RNTI is unknown and the CRC check is not possible—to evaluate candidate subsets and demodulation/decoding alternatives. The decoding success may be estimated based on decoder metric (e.g., the S-metric of a soft Viterbi decoder, or corresponding metrics in other soft decoders), output soft bit estimate LLR magnitude (average or distribution), etc. In such embodiments, the UE may choose to use PDCCH transmissions that have the same AL and similar estimated received power as transmissions directed to itself, in order to avoid tuning the reduced subset selection to significantly different AL and precoding configurations.

In other embodiments, the UE can determine the PDCCH reception quality metric based on decoding margins resulting from different subset selections and adopt a subset that provides at least a predetermined sufficient decoding margin. To estimate the decoding margin, the UE may tentatively decode multiple deliberately degraded versions of the received signal corresponding to the subset, each with a predetermined degree of degradation, and determine the margin based on the most degraded signal than can still be decoded. In one embodiment, the UE may estimate the SINR of the received PDCCH and add appropriately scaled noise prior to a decoding attempt to emulate a received signal with a x dB lower SINR. The value of x can be determined by the UE, e.g. by looking at the current and historical statistics, or following appropriate models. Furthermore, the value can be deterministic or random. In another embodiment, the UE may puncture the bit estimates extracted from the received signal (insert erasures) to effectively change the code rate or modify the effective signal SINR prior to decoding.

Decoding margin estimation for subsets of available antennas and receive chains can additionally consider fading robustness based on the diversity provided by the selected antenna subset, or based on characterized degree of uncorrelated fading between the antennas. Decoding margin can further consider spatial interference suppression capability, and typical SIR improvement, due to, e.g., IRC combining using the selected antenna subset. It can also consider the array gain for the received signal energy based on the number of selected antenna elements.

In other embodiments, the decoding margin may not be explicitly determined by tentative decoding but can be estimated based on estimated PDCCH SINR, or UE measurements as RSRQ, RSRP, etc.

In general, the UE can have access to the coded bits but not the originally transmitted ones. As such, in some embodiments, the UE can further consider the magnitude of the error vector (ERV, also referred to as error vector magnitude, EVM), which is a difference between the soft/hard decoded bits between the full and low power modes. In this manner, the UE can train itself by decoding PDCCH using the full power mode, and then look at the ERV with respect to different low power mode configurations. The UE can further determine a specific threshold for ERV above which, the specific lower power configurations are discarded.

In another embodiment, the UE can look at the difference (e.g., Euclidean distance) between the DM-RS estimation obtained between a full power mode (e.g., using all available resources) and low power modes (e.g., using subsets of available resources), or between different low power modes, in order to choose the appropriate low power operation.

The UE can further evaluate whether the subset selection is robust and reliable. To determine that, the UE may determine whether the subset selection and/or decoding margin estimates from multiple received PDCCH occasions are consistent. If they vary to a degree that exceeds a threshold, e.g. due to varying PDCCH LA by the network or due to rapid channel changes, the UE may select a different subset. Alternately, the UE can determine to use all available resources rather than a subset.

In other embodiments, the UE can evaluate robustness based on current ERV with respect to the previous ERVs. If the variation exceeds a threshold, the UE can discard the low power configurations or select a different subset.

If the selected subset is deemed reliable and useful, the UE selects a reception subset for PDCCH monitoring. Otherwise, the UE can determine to use all available resources for PDCCH monitoring. In some embodiments, the reception subset may be the subset with the smallest number of antennas that satisfies a predetermined performance criterion (e.g. successful decoding, predetermined decoding margin, etc.). In some embodiments, when selecting (or deciding to whether to use) a subset, the UE can consider if there is sufficient time to transition from the selected subset for PDCCH monitoring to the full power configuration for subsequent PDSCH reception. This can be particularly important in cases where the UE may expect same-slot scheduling, or scheduling with minimum SLIV.

The exemplary method and/or procedure can include the operations of block 830, where the UE can monitor for PDCCH transmissions using only the selected subset of resources. For example, the UE will collect PDCCH samples only using the reception subset, while other resources (e.g., antennas and receive chains) may be deactivated during PDCCH monitoring, thereby reducing the UE's energy consumption associated with PDCCH monitoring.

In some embodiments, the monitoring operations in block 830 can be performed during first PDCCH occasions. In such embodiments, the exemplary method and/or procedure can also include the operations of block 840, where the UE can determine, for one or second PDCCH occasions, respective PDCCH reception quality metrics for each of the plurality of candidate subsets.

In some embodiments, the operations of block 840 can include the operations of sub-block 841, where the UE can, during each second PDCCH occasion, receiving signal samples using each of the available resources. In such embodiments, the operations of block 840 can include the operations of sub-block 842, where the UE can, for each second PDCCH occasion and each candidate subset, determining a PDCCH reception quality metric based on the signal samples received during that PDCCH occasion using that candidate subset.

In some embodiments, the exemplary method and/or procedure can also include the operations of block 850, where the UE can select one of the following based on the PDCCH reception quality metrics determined for the second PDCCH occasions: a further candidate subset different than the particular candidate subset, or all available resources.

The following explanation provides additional details and/or embodiments related to the operations of blocks 840-850 and their sub-blocks.

To ensure robustness of the reduced-subset operation, the UE further occasionally re-evaluates the subset selection considering additional (or all) subset options, e.g., sampling with the full antenna set and performing subset selection in a similar manner as in blocks 810-820. This can increase the robustness and allows identifying better resource combinations as they may change over time. The full sampling and evaluations may be performed with a pre-determined period or be triggered by a condition, e.g. reduced reception quality, decreased decoder metric or soft value quality, etc.

Furthermore, the UE may specifically monitor for occasions where a PDCCH may likely have been transmitted but was not successfully decoded—those serve as an indication that the current reception subset may have become suboptimal, or that the subset approach should be terminated. In one embodiment, the UE detects a likely presence of PDCCH by detecting DMRS patterns consistent with PDCCH transmission, even if successful decoding did not take place. In another embodiment, the UE detects a likely presence of PDCCH by observing a decoder metric or soft value quality metric that lies above the level corresponding to non-PDCCH input but below successful decoding—this indicates that the input signal was consistent with a PDCCH transmission but did not have a sufficient quality for decoding.

Some extent of failed PDCCH reception may be acceptable. That extent may be limited to a rate that is significantly lower than the PDCCH BLER. If failures exceeding such a threshold are detected, the UE may select a different subset, adjust the decoding margin value, deactivate the reduced-antenna monitoring mode, etc.

Instead of—or in addition to—reducing the number of antennas and receive chains, PDCCH monitoring with partial bandwidth (e.g., only a subset of the PDCCH CORESET/SS) and partial time duration (e.g., one instead of two OFDM symbols) may be applied in various embodiments. These variants can also provide UE energy-consumption reduction and can be based on the same selection principles as antenna reduction.

For example, if the UE is configured with a compact CORESET/SS (i.e., closely spaced PRBs in frequency domain) with respect to an entire BWP, then the UE can occasionally lower its receive bandwidth for PDCCH monitoring and then open it up for PDSCH reception. The same principle can be applied in the time domain. For example, the UE can go to microsleep if a narrow PDCCH reception is expected (e.g. one symbol), so long as the UE is ready for subsequent PDSCH reception.

More generally, the techniques described above can be used for monitoring DL/UL scheduling PDCCH, wakeup signal (WUS) PDCCH, paging/SI PDCCH, or other power saving PDCCHs. Moreover, the UE may decide to use the lower power configuration for specific PDCCH but not for another one. For example, the UE may select a full power configuration using all available resources if it expects a SI update.

In case of robustness, the UE can further decide to move from lower power configuration to the full power configuration every k PDCCH reception occasions. For example, the value of k value can be the number of times that the network retransmits PDCCH to a UE before releasing the UE, which has not received the k transmissions.

In Idle mode, the network usually transmits the paging PDCCH with a high AL to make sure the UE can receive the message. Even so, the UE can apply the above principles of the described embodiments to paging PDCCH reception, e.g., if SSB measurements depict a large SINR and thus lower number of antennas, or other low power modes are determined to be applicable.

In addition, the UE can also apply the above principles of the described embodiments to PDSCH reception, e.g., if the network (gNB) adopts non-code book-based precoding and the maximum number of layers is known to the UE. In such cases, the UE may decide to activate a specific low power configuration mode, if based on measurements, historical data, etc., it can make sure a proper decoding of PDSCH. For example, if the UE expects a maximum two layers reception, and the UE channel conditions ensures an acceptable reception of the PDSCH with a lower number of antennas, then the UE can deactivate a subset of antennas to reduce energy consumption.

In addition, the UE can consider the number of HARQ retransmissions as a trade-off, since a lower PDSCH decoding rate may lead to additional HARQ retransmission and thus a larger energy consumption. The UE can further extend the same principles to PDSCH power mode adaptation based on the scheduled time and/or frequency resources for PDSCH reception, in a similar manner as discussed above in relation to PDCCH. For example, if the UE is scheduled with a sufficiently large SLIV value, the UE can turn off its RF part or apply other appropriate power efficient techniques to save power before the start of PDSCH reception.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 9:
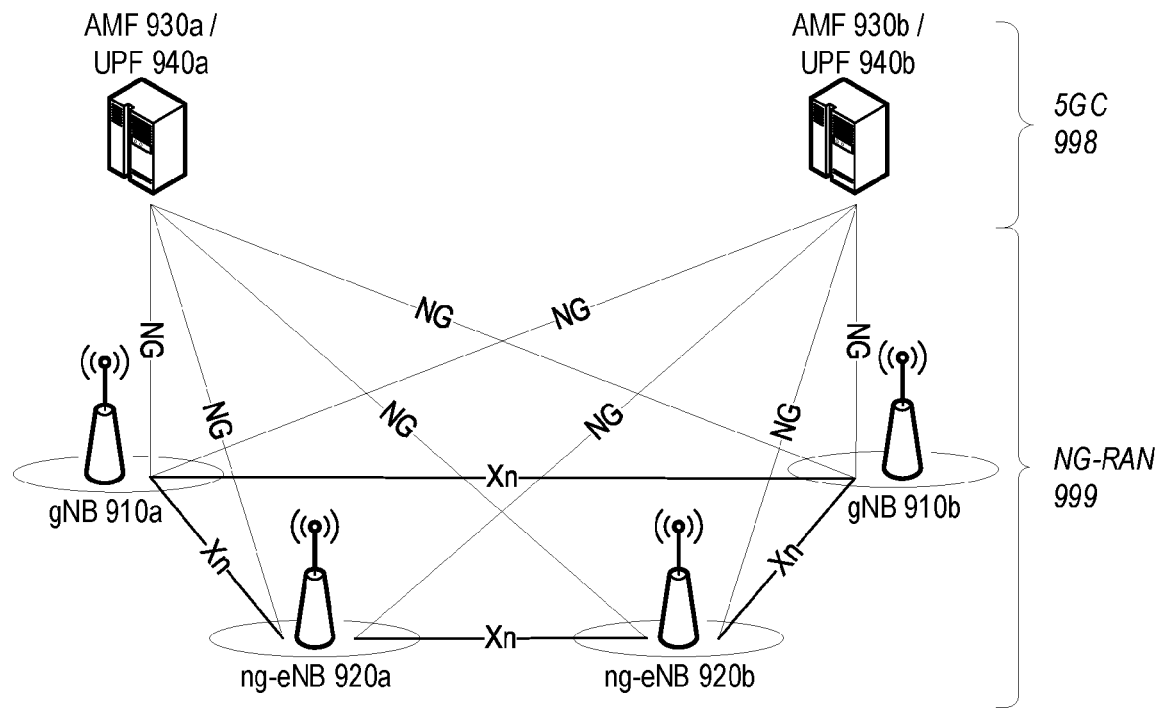
FIG. 9 shows a high-level view of an exemplary 5G network architecture, including a Next Generation Radio Access Network (NG-RAN) and a 5G Core (5GC), according to various exemplary embodiments of the present disclosure.

FIG. 9 shows a high-level view of an exemplary 5G network architecture, including a Next Generation Radio Access Network (NG-RAN) 999 and a 5G Core (5GC) 998. As shown in the figure, NG-RAN 999 can include gNBs 910 (e.g., 910*a,b*) and ng-eNBs 920 (e.g., 920*a,b*) that are interconnected with each other via respective Xn interfaces. The gNBs and ng-eNBs are also connected via the NG interfaces to 5GC 998, more specifically to the AMF (Access and Mobility Management Function) 930 (e.g., AMFs 930*a,b*) via respective NG-C interfaces and to the UPF (User Plane Function) 940 (e.g., UPFs 940*a,b*) via respective NG-U interfaces.

NG-RAN 999 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

Each of the gNBs 910*a,b* can support the NR radio interface, including frequency division duplexing (FDD), time division duplexing (TDD), or a combination thereof. In contrast, each of ng-eNBs 920*a,b* supports the LTE radio interface but, unlike conventional LTE eNBs (e.g., eNBs 105-115 shown in FIG. 1), connect to the 5GC via the NG interface. In addition, the gNBs 910*a,b* and ng-eNBs 920*a,b* can provide multi-RAT (radio access technology) dual connectivity (MR-DC) to UEs as described above, including NG-RAN E-UTRA/NR Dual Connectivity (NGEN-DC).

Each of the gNBs 910*a,b* can include a central (or centralized) unit (CU or gNB-CU) and one or more distributed (or decentralized) units (DU or gNB-DU). The CUs are logical nodes that host higher-layer protocols and perform various gNB functions such controlling the operation of DUs. Similarly, the DUs are logical nodes that host lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 10:
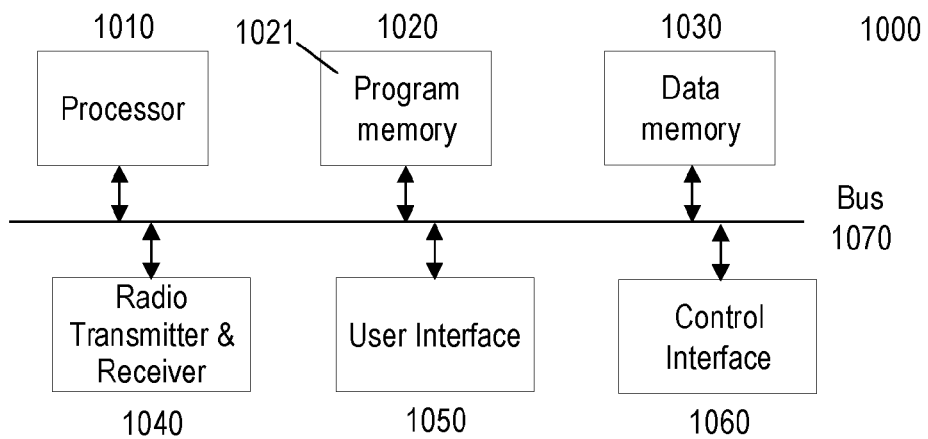
FIG. 10 is a block diagram of an exemplary wireless device or user equipment (UE), according to various exemplary embodiments of the present disclosure.

FIG. 10 shows a block diagram of an exemplary wireless device or user equipment (UE) 1000 configurable according to various exemplary embodiments of the present disclosure, including execution of instructions on a computer-readable medium that correspond to operations of one or more exemplary methods and/or procedures described herein above.

Exemplary device 1000 can comprise a processor 1010 that can be operably connected to a program memory 1020 and/or a data memory 1030 via a bus 1070 that can comprise parallel address and data buses, serial ports, or other methods and/or structures known to those of ordinary skill in the art. Program memory 1020 can store software code, programs, and/or instructions (collectively shown as computer program product 1021 in FIG. 10) executed by processor 1010 that can configure and/or facilitate device 1000 to perform various operations, including exemplary methods and/or procedures described herein.

More generally, program memory 1020 can store software code or program executed by processor 1010 that facilitates, causes and/or programs exemplary device 1000 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.10 WiFi, HDMI, USB, Firewire, etc., or any other current or future protocols that can be utilized in conjunction with radio transceiver 1040, user interface 1050, and/or host interface 1060.

More specifically, processor 1010 can execute program code stored in program memory 1020 that corresponds to MAC, RLC, PDCP, and RRC layer protocols standardized by 3GPP (e.g., for NR and/or LTE). As a further example, processor 1010 can execute program code stored in program memory 1020 that, together with radio transceiver 1040, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1020 can also store software code executed by processor 1010 to control the functions of device 1000, including configuring and controlling various components such as radio transceiver 1040, user interface 1050, and/or host interface 1060. Program memory 1020 can also store one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 1020 can comprise an external storage arrangement (not shown) remote from device 1000, from which the instructions can be downloaded into program memory 1020 located within or removably coupled to device 1000, so as to enable execution of such instructions.

Data memory 1030 can comprise memory area for processor 1010 to store variables used in protocols, configuration, control, and other functions of device 1000, including operations corresponding to, or comprising, any of the exemplary methods and/or procedures described herein. Moreover, program memory 1020 and/or data memory 1030 can comprise non-volatile memory (e.g., flash memory), volatile memory (e.g., static or dynamic RAM), or a combination thereof. Furthermore, data memory 1030 can comprise a memory slot by which removable memory cards in one or more formats (e.g., SD Card, Memory Stick, Compact Flash, etc.) can be inserted and removed. Persons of ordinary skill in the art will recognize that processor 1010 can comprise multiple individual processors (including, e.g., multi-core processors), each of which implements a portion of the functionality described above. In such cases, multiple individual processors can be commonly connected to program memory 1020 and data memory 1030 or individually connected to multiple individual program memories and or data memories. More generally, persons of ordinary skill in the art will recognize that various protocols and other functions of device 1000 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1040 can comprise radio-frequency transmitter and/or receiver functionality that facilitates the device 1000 to communicate with other equipment supporting like wireless communication standards and/or protocols. In some exemplary embodiments, the radio transceiver 1040 includes a transmitter and a receiver that enable device 1000 to communicate with various 5G/NR networks according to various protocols and/or methods proposed for standardization by 3GPP and/or other standards bodies. For example, such functionality can operate cooperatively with processor 1010 to implement a PHY layer based on OFDM, OFDMA, and/or SC-FDMA technologies, such as described herein with respect to other figures. In some exemplary embodiments, the radio transceiver 1040 can comprise some or all of the receiver functionality shown in and described above with reference to FIG. 5.

In some exemplary embodiments, the radio transceiver 1040 includes an LTE transmitter and receiver that can facilitate the device 1000 to communicate with various LTE LTE-Advanced (LTE-A), and/or NR networks according to standards promulgated by 3GPP. In some exemplary embodiments of the present disclosure, the radio transceiver 1040 includes circuitry, firmware, etc. necessary for the device 1000 to communicate with various 5G/NR, LTE, LTE-A, UMTS, and/or GSM/EDGE networks, also according to 3GPP standards. In some exemplary embodiments of the present disclosure, radio transceiver 1040 includes circuitry, firmware, etc. necessary for the device 1000 to communicate with various CDMA2000 networks, according to 3GPP2 standards.

In some exemplary embodiments of the present disclosure, the radio transceiver 1040 is capable of communicating using radio technologies that operate in unlicensed frequency bands, such as IEEE 802.10 WiFi that operates using frequencies in the regions of 2.4, 5.10, and/or 100 GHz. In some exemplary embodiments of the present disclosure, radio transceiver 1040 can comprise a transceiver that is capable of wired communication, such as by using IEEE 802.3 Ethernet technology. The functionality particular to each of these embodiments can be coupled with or controlled by other circuitry in the device 1000, such as the processor 1010 executing program code stored in program memory 1020 in conjunction with, or supported by, data memory 1030.

User interface 1050 can take various forms depending on the particular embodiment of device 1000, or can be absent from device 1000 entirely. In some exemplary embodiments, user interface 1050 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 1000 can comprise a tablet computing device including a larger touchscreen display. In such embodiments, one or more of the mechanical features of the user interface 1050 can be replaced by comparable or functionally equivalent virtual user interface features (e.g., virtual keypad, virtual buttons, etc.) implemented using the touchscreen display, as familiar to persons of ordinary skill in the art. In other embodiments, the device 1000 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1000 having a touch screen display are capable of receiving user inputs, such as inputs related to exemplary methods and/or procedures described herein or otherwise known to persons of ordinary skill in the art.

In some exemplary embodiments of the present disclosure, device 1000 can comprise an orientation sensor, which can be used in various ways by features and functions of device 1000. For example, the device 1000 can use outputs of the orientation sensor to determine when a user has changed the physical orientation of the device 1000's touch screen display. An indication signal from the orientation sensor can be available to any application program executing on the device 1000, such that an application program can change the orientation of a screen display (e.g., from portrait to landscape) automatically when the indication signal indicates an approximate 100-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1060 of the device 1000 can take various forms depending on the particular exemplary embodiment of device 1000 and of the particular interface requirements of other devices that the device 1000 is intended to communicate with and/or control. For example, the control interface 1060 can comprise an RS-232 interface, an RS-485 interface, a USB interface, an HDMI interface, a Bluetooth interface, an IEEE 10104 ("Firewire") interface, an I²C interface, a PCMCIA interface, or the like. In some exemplary embodiments of the present disclosure, control interface 1060 can comprise an IEEE 802.3 Ethernet interface such as described above. In some exemplary embodiments of the present disclosure, the control interface 1060 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1000 can comprise more functionality than is shown in FIG. 10 including, for example, a video and/or still-image camera, microphone, media player and/or recorder, etc. Moreover, radio transceiver 1040 can include circuitry necessary to communicate using additional radio-frequency communication standards including Bluetooth, GPS, and/or others. Moreover, the processor 1010 can execute software code stored in the program memory 1020 to control such additional functionality. For example, directional velocity and/or position estimates output from a GPS receiver can be available to any application program executing on the device 1000, including various exemplary methods and/or computer-readable media according to various exemplary embodiments of the present disclosure.

Figure 11:
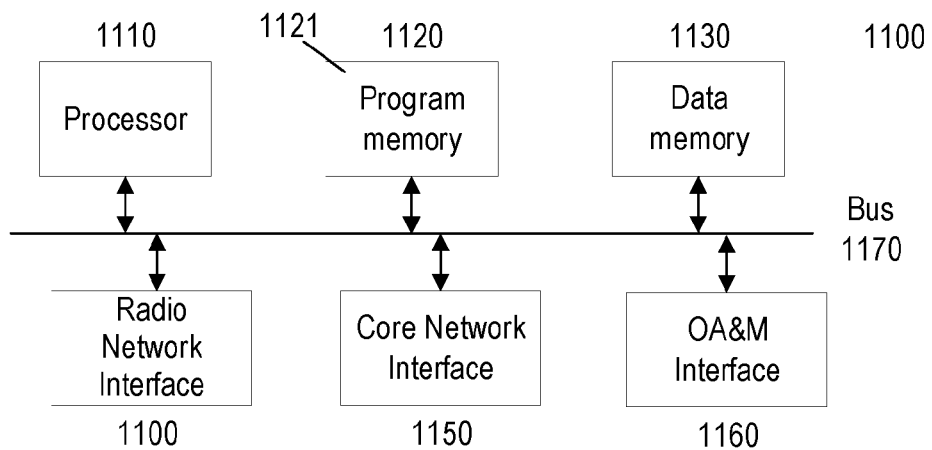
FIG. 11 is a block diagram of an exemplary network node (e.g., a base station, eNB, or gNB), according to various exemplary embodiments of the present disclosure.

FIG. 11 shows a block diagram of an exemplary network node 1100 configurable according to various embodiments of the present disclosure, including those described above with reference to other figures. In some exemplary embodiments, network node 1100 can comprise a base station, eNB, gNB, or component thereof. Network node 1100 comprises processor 1110 which is operably connected to program memory 1120 and data memory 1120 via bus 1170, which can comprise parallel address and data buses, serial ports, or other methods and/or structures known to those of ordinary skill in the art. In some exemplary embodiments, processor 1110 can comprise some or all of the functionality of processor 500 shown in FIG. 5 and discussed in more detail above.

Program memory 1120 can store software code, programs, and/or instructions (collectively shown as computer program product 1121 in FIG. 11) executed by processor 1110 that can configure and/or facilitate network node 900 to communicate with one or more other devices using protocols according to various embodiments of the present disclosure, including one or more exemplary methods and/or procedures discussed above. Program memory 1120 can also store software code executed by processor 1110 that can facilitate and specifically configure network node 1100 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1140 and core network interface 1150. Program memory 1120 can also store software code executed by processor 1110 to control the functions of network node 1100, including configuring and controlling various components such as radio network interface 1140 and core network interface 1150.

Data memory 1120 can comprise memory area for processor 1110 to store variables used in protocols, configuration, control, and other functions of network node 1100. As such, program memory 1120 and data memory 1120 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1110 can comprise multiple individual processors (not shown), each of which implements a portion of the functionality described above. In such case, multiple individual processors may be commonly connected to program memory 1120 and data memory 1120 or individually connected to multiple individual program memories and/or data memories. More generally, persons of ordinary skill in the art will recognize that various protocols and other functions of network node 1100 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1140 can comprise transmitters, receivers, signal processors, ASICs, antennas, beamforming units, and other circuitry that enables network node 1100 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1140. According to further exemplary embodiments of the present disclosure, the radio network interface 1140 can comprise a PHY layer based on OFDM, OFDMA, and/or SC-FDMA technologies. In some embodiments, the functionality of such a PHY layer can be provided cooperatively by radio network interface 1140 and processor 1110 (including program code in memory 1120).

Core network interface 1150 can comprise transmitters, receivers, and other circuitry that enables network node 1100 to communicate with other equipment in a core network such as, in some embodiments, circuit-switched (CS) and/or packet-switched Core (PS) networks. In some embodiments, core network interface 1150 can comprise the S1 interface standardized by 3GPP. In some exemplary embodiments, core network interface 1150 can comprise one or more interfaces to one or more SGWs, MMES, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1150 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

By way of example and without limitation, core network interface 1150 can comprise one or more of the S1, S1-U, and NG interfaces standardized by 3GPP. Also by way of example, radio network interface 1140 can comprise the Uu interface standardized by 3GPP.

OA&M interface 1160 can comprise transmitters, receivers, and other circuitry that enables network node 1100 to communicate with external networks, computers, databases, and the like for purposes of operations, administration, and maintenance of network node 1100 or other network equipment operably connected thereto. Lower layers of OA&M interface 1160 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

Moreover, in some embodiments, one or more of radio network interface 1140, core network interface 1150, and OA&M interface 1160 may be multiplexed together on a single physical interface, such as the examples listed above.

Figure 12:
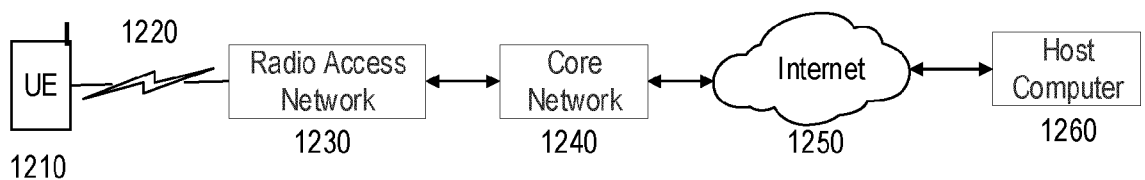
FIG. 12 is a block diagram of an exemplary network configuration usable to provide over-the-top (OTT) data services between a host computer and a user equipment, according to various exemplary embodiments of the present disclosure.

FIG. 12 is a block diagram of an exemplary network configuration usable to provide over-the-top (OTT) data services between a host computer and a user equipment (UE), according to one or more exemplary embodiments of the present disclosure. UE 1210 can communicate with radio access network (RAN) 1230 over radio interface 1220, which can be based on protocols described above including, e.g., LTE, LTE-A, and 5G/NR. RAN 1230 can include one or more network nodes (e.g., base stations, eNBs, gNBs, ng-eNBs, en-gNBs, controllers, etc.). RAN 1230 can further communicate with core network 1240 according to various protocols and interfaces described above. For example, one or more apparatus (e.g., base stations, eNBs, gNBs, etc.) comprising RAN 1230 can communicate to core network 1240 via core network interface 1450 described above. In some exemplary embodiments, RAN 1230 and core network 1240 can be configured and/or arranged as shown in other figures discussed above. Similarly, UE 1210 can also be configured and/or arranged as shown in other figures discussed above.

Core network 1240 can further communicate with an external packet data network, illustrated in FIG. 12 as Internet 1250, according to various protocols and interfaces known to persons of ordinary skill in the art. Many other devices and/or networks can also connect to and communicate via Internet 1250, such as exemplary host computer 1260. In some exemplary embodiments, host computer 1260 can communicate with UE 1210 using Internet 1250, core network 1240, and RAN 1230 as intermediaries. Host computer 1260 can be a server (e.g., an application server) under ownership and/or control of a service provider. Host computer 1260 can be operated by the OTT service provider or by another entity on the service provider's behalf.

For example, host computer 1260 can provide an over-the-top (OTT) packet data service to UE 1210 using facilities of core network 1240 and RAN 1230, which can be unaware of the routing of an outgoing/incoming communication to/from host computer 1260. Similarly, host computer 1260 can be unaware of routing of a transmission from the host computer to the UE, e.g., the routing of the transmission through RAN 1230. Various OTT services can be provided using the exemplary configuration shown in FIG. 12 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 12 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments that receive a physical downlink control channel (PDCCH) using a selectable portion of available resources, as described herein, can play a critical role by enabling UE 1310 and RAN 1330 to meet the requirements of the particular OTT service between host computer 1360 and UE 1310. Various benefits can result from these techniques. For example, the UE can make a qualified decision, based on actual reception quality observations, about when and how to reduce its PDCCH monitoring antenna set without compromising PDCCH robustness and incurring losses in PDSCH performance and network resource usage. Such techniques allow the UE to reduce its PDCCH monitoring antenna set to facilitate lower-power operation when a sufficient decoding margin exists, and also provide a safety mechanism by monitoring the current margin. In this manner, such techniques facilitate lower-power operation without compromising PDCCH robustness and without incurring losses in PDSCH performance and resulting network resource usage. By improving UE and network performance in these and other ways, exemplary embodiments improve data throughput in a coverage area and enable a greater number of users to utilize data-intensive services such as streaming video in various coverage conditions without excessive power consumption or other degradations to user experience, such as dropped data connections caused by delayed handover due to measurement delays.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the methods, apparatus, and computer-readable media described herein include, but are not limited to, the following enumerated embodiments:

1. A method for receiving, by a user equipment (UE), one or more physical downlink control channels (PDCCHs) from a wireless network using a selectable portion of a plurality of available resources, the method comprising:
   determining (810) one or more PDCCH reception quality metrics for each of a plurality of candidate subsets of the available resources;
   selecting (820) a particular candidate subset based on the determined PDCCH reception quality metrics; and
   monitoring (830) for PDCCH transmissions using only the selected subset of resources.

2. The method of embodiment 1, wherein determining (810) the one or more PDCCH reception quality metrics for each candidate subset comprises:
   monitoring (811) a plurality of PDCCH occasions using the candidate subset of resources; and
   for each PDCCH occasion, determining (812) a PDCCH reception quality metric for the candidate subset.

3. The method of any of embodiments 1-2, wherein selecting (820) the particular candidate subset comprises:
   selecting (821) one or more candidate subsets corresponding to PDCCH reception quality metrics that are greater than a first threshold; and
   from the one or more selected candidate subsets, selecting (822) the particular candidate subset having the fewest number of resources.

4. The method of any of embodiments 1-3, wherein selecting (820) the particular candidate subset is further based on a duration between PDCCH reception and subsequent reception of a physical downlink shared channel (PDSCH) associated with the PDCCH.

5. The method of any of embodiments 2-4, wherein selecting (820) the particular candidate subset comprises:
   for each of one or more candidate subsets, determining (823) a variation among the plurality of PDCCH reception quality metrics; and
   selecting (824) the particular candidate subset based on the corresponding variation being less than a second threshold.

6. The method of embodiment 2, wherein:
   monitoring (811) the plurality of PDCCH occasions using the candidate subset of resources comprises receiving first PDCCH transmissions directed to the UE; and
   determining (812) the PDCCH reception quality metric for the first PDCCH transmissions comprises verifying a CRC field, in each received first PDCCH transmission, based on an identifier associated with the UE.

7. The method of embodiment 6, wherein:
   verifying a CRC field comprises verifying the CRC field in each received first PDCCH transmission a plurality of times, with each verification of the CRC field being associated with a different amount of degradation of the received PDCCH transmission; and
   determining (812) the PDCCH reception quality metric for each first PDCCH transmission comprises selecting the maximum amount of degradation under which the verification of the CRC field is successful.

8. The method of embodiment 6, wherein:
monitoring (811) the plurality of PDCCH occasions using the candidate subset of resources comprises receiving second PDCCH transmissions directed to other UEs; and
determining (812) the PDCCH reception quality metric for the second PDCCH transmissions comprises computing a decoding metric without verifying a CRC field associated with each received second PDCCH transmission.

9. The method of embodiment 8, wherein the second PDCCH transmissions have at least one of the following parameters in common with the first PDCCH transmissions: aggregation level or estimated received power.

10. The method of any of embodiments 1-9, wherein determining (810) the one or more PDCCH reception quality metrics for each candidate subset comprises:
during a plurality of PDCCH occasions, receiving (813) signal samples using each of the available resources; and
for each PDCCH occasion and each candidate subset, determining (814) a PDCCH reception quality metric based on the signal samples received during that PDCCH occasion using that candidate subset.

11. The method of any of embodiments 1-10, wherein:
monitoring (830) for PDCCH transmissions using only the selected subset is performed during first PDCCH occasions; and
the method further comprises determining (840), for one or more second PDCCH occasions, respective PDCCH reception quality metrics for each of the plurality of candidate subsets.

12. The method of embodiment 11, wherein determining (840) the one or more PDCCH reception quality metrics for the one or more second PDCCH occasions comprises:
during each second PDCCH occasion, receiving (841) signal samples using each of the available resources; and
for each second PDCCH occasion and each candidate subset, determining (842) a PDCCH reception quality metric based on the signal samples received during that second PDCCH occasion using that candidate subset.

13. The method of any of embodiments 11-12, further comprising selecting (850) one of the following based on the PDCCH reception quality metrics determined for the second PDCCH occasions:
a further candidate subset different than the particular candidate subset, or
all available resources.

14. The method of any of embodiments 1-13, wherein the available resources include one or more of the following: antennas and receive chains; reception frequency bandwidth; and reception time duration.

15. The method of any of embodiments 3 and 5, further comprising determining (825) at least one of the following based on a parameter configured by the wireless network: the first threshold and the second threshold.

16. A user equipment (UE) configured to receive a physical downlink control channel (PDCCH) from a wireless network using a selectable portion of a plurality of available resources, the UE comprising:

communication circuitry configured to communicate with the wireless network; and
processing circuitry operatively associated with the communication circuitry, whereby the processing circuitry and communication circuitry are configured to perform operations corresponding to the methods of any of embodiments 1-15.

17. A user equipment (UE) configured to receive a physical downlink control channel (PDCCH) from a wireless network using a selectable portion of a plurality of available resources, the UE being further arranged to perform operations corresponding to the methods of any of embodiments 1-15.

18. A non-transitory, computer-readable medium storing computer-executable instructions that, when executed by at least one processor of a user equipment (UE), configure the UE to perform operations corresponding to the methods of any of embodiments 1-15.

19. A computer program product comprising computer-executable instructions that, when executed by at least one processor of a user equipment (UE), configure the UE to perform operations corresponding to the methods of any of embodiments 1-15.

In some embodiments, the UE may estimate the SINR of the received PDCCH and add appropriately scaled noise prior to a decoding attempt to emulate a received signal with a lower SINR, e.g. with say x dB The value of x can be determined by the UE, e.g. by looking at current and/or historical statistics, or following some appropriate models. Furthermore, the value x can be deterministic, i.e. predetermined, or random according to some distribution or model. In some embodiments, the UE may puncture bit estimates extracted from the received signal, i.e. erasures of bits according to some pattern, to effectively change the code rate or modify the effective signal SINR prior to decoding.

The reception quality may be measured in different ways, e.g., considering decoding margin, error vector (ERV), estimating demodulation reference signals (DM-RS), etc.

The approach demonstrated herein may be used for monitoring downlink or uplink (DL/UL) scheduling PDCCH, wake-up signal (WUS) PDCCH, or other power saving PDCCHs, paging/system information (SI) PDCCH, etc. However, the UE may decide to use a lower power configuration for specific PDCCH and a normal, i.e. full power configuration, for others. E.g., the UE may return to the full power configuration if it expects a SI update.

In case of robustness, the UE may further decide to move from a lower power configuration to the full power one, every k number of PDCCH message occasions (MO). The value k may for example be the number of times that the NW retransmits PDCCH before releasing the UE after it has been missed k times by the UE.

In idle mode, the NW usually transmits the paging PDCCH with a high abstraction layer (AL) to make sure the UE can receive the message; However the UE can apply the above procedures in this case as well. For example, SSB measurements may depict a large SINR, and thus a lower number of antennas (in comparison with a default setup) or other low power mode may be applied.

The approach may be used for physical downlink shared channel (PDSCH) as well, particularly in case gNB adopts non-code book-based precoding, and the maximum number of layers is known to the UE. As such the UE may decide to activate a specific low power configuration mode, whether based on measurements, historical data, etc., and can make sure a proper decoding of PDSCH. E.g., if the UE expects maximum two layers reception, and the UE channel conditions ensures an acceptable reception of the PDSCH with a lower number of antennas, then the UE can deactivate a subset of antennas to save additional powers. Here, the UE can further consider the number of hybrid automatic repeat request (HARQ) retransmissions as a trade-off, since a lower PDSCH decoding rate may lead to additional HARQ retransmission and thus a larger power consumption. The UE can further extend the same principle to the power mode adaptation based on the scheduled time/frequency (T/F) components for PDSCH in the same line as PDCCH. E.g., if the UE is scheduled with a sufficiently large start and length indicator value (SLIV), the UE can turn off its radio frequency (RF) part or apply other appropriate power efficiency techniques to save power before the start of PDSCH reception.

The discussed selection of a particular candidate subset may be based on a duration between e.g. PDCCH reception and subsequent reception of a PDSCH associated with a PDCCH. This is equally feasible for PUSCH as well, or generally to a PDCCH which schedules any downlink and/or uplink (DL/UL) operation or triggers an activity like a wake-up signal (WUS). Thus, the approach may be used for, as also discussed above, monitoring DL/UL scheduling PDCCH, WUS PDCCH, or other power saving PDCCHs, paging/SI PDCCH, etc. The UE itself may decide to use the lower power configuration for one specific PDCCH but not for another. E.g., the UE may return, if it expects an SI update, to the normal, legacy, full power, or what the configuration is referred to for the setup where energy efficiency measures according to this disclosure are not applied.

In this disclosure energy efficiency has been discussed in view of resources, which for example may be antenna resources and/or bandwidth resources as parameters which can be adjusted to achieve the desired energy efficiency in a UE.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for receiving, by a user equipment (UE), one or more physical downlink control channels (PDCCHs) from a wireless network using a selectable portion of a plurality of available resources, the method comprising the UE:
determining one or more PDCCH reception quality metrics for each of a plurality of candidate subsets of the available resources;
selecting a particular candidate subset out of the plurality of candidate subsets based on the determined PDCCH reception quality metrics; and
monitoring for PDCCH transmissions using only the selected subset of resources, wherein:
verifying a CRC field comprises verifying the CRC field in each received first PDCCH transmission a plurality of times, with each verification of the CRC field being associated with a different amount of degradation of the received PDCCH transmission; and
determining the PDCCH reception quality metric for each first PDCCH transmission comprises selecting the maximum amount of degradation under which the verification of the CRC field is successful.

2. The method of claim 1, wherein the determining the one or more PDCCH reception quality metrics for each candidate subset comprises:
monitoring a plurality of PDCCH occasions using the candidate subset of resources; and
for each PDCCH occasion, determining a PDCCH reception quality metric for the candidate subset.

3. The method of claim 2, wherein the selecting the particular candidate subset comprises:
for each of one or more candidate subsets, determining a variation among the plurality of PDCCH reception quality metrics; and
selecting the particular candidate subset based on the corresponding variation being less than a second threshold.

4. The method of claim 3:
wherein the selecting the particular candidate subset comprises:
selecting one or more candidate subsets corresponding to PDCCH reception quality metrics that are greater than a first threshold; and
selecting, from the one or more selected candidate subsets, the particular candidate subset having a fewest number of resources;
wherein the method comprises determining, based on a parameter configured by the wireless network, the first threshold and/or the second threshold.

5. The method of claim 2, wherein:
monitoring the plurality of PDCCH occasions using the candidate subset of resources comprises receiving first PDCCH transmissions directed to the UE; and
determining the PDCCH reception quality metric for the first PDCCH transmissions comprises verifying a CRC field, in each received first PDCCH transmission, based on an identifier associated with the UE.

6. The method of claim 5, wherein:
monitoring the plurality of PDCCH occasions using the candidate subset of resources comprises receiving second PDCCH transmissions directed to other UEs; and
determining the PDCCH reception quality metric for the second PDCCH transmissions comprises computing a decoding metric without verifying a CRC field associated with each received second PDCCH transmission.

7. The method of claim 6, wherein the second PDCCH transmissions have at least one of the following parameters in common with the first PDCCH transmissions: aggregation level or estimated received power.

8. The method of claim 1, wherein the selecting the particular candidate subset comprises:
selecting one or more candidate subsets corresponding to PDCCH reception quality metrics that are greater than a first threshold; and
selecting, from the one or more selected candidate subsets, the particular candidate subset having a fewest number of resources.

9. The method of claim 1, wherein the selecting the particular candidate subset is based on a duration between PDCCH reception and subsequent reception of a physical downlink shared channel (PDSCH) associated with the PDCCH.

10. The method of claim 1, wherein the determining the one or more PDCCH reception quality metrics for each candidate subset comprises:
during a plurality of PDCCH occasions, receiving signal samples using each of the available resources; and for each PDCCH occasion and each candidate subset, determining a PDCCH reception quality metric based on the signal samples received during that PDCCH occasion using that candidate subset.

11. The method of claim 1:
wherein monitoring for PDCCH transmissions using only the selected subset is performed during first PDCCH occasions; and
wherein the method further comprises determining, for one or more second PDCCH occasions, respective PDCCH reception quality metrics for each of the plurality of candidate subsets.

12. The method of claim 11, wherein the determining the one or more PDCCH reception quality metrics for the one or more second PDCCH occasions comprises:
during each second PDCCH occasion, receiving signal samples using each of the available resources; and
for each second PDCCH occasion and each candidate subset, determining a PDCCH reception quality metric based on the signal samples received during that second PDCCH occasion using that candidate subset.

13. The method of claim 11, further comprising selecting one of the following based on the PDCCH reception quality metrics determined for the second PDCCH occasions:
a further candidate subset different than the particular candidate subset; or
all available resources.

14. The method of claim 1, wherein the available resources include:
antennas and receive chains, reception frequency bandwidth, and/or reception time duration.

15. The method of claim 1, wherein the determining of the one or more PDCCH reception quality metrics comprises:
estimating Signal-and-Interference-to-Noise Ratio (SINR) of the received PDCCH; and
adding a scaled noise value to emulate a received signal with a lowered SINR.

16. The method of claim 1, wherein the determining of the one or more PDCCH reception quality metrics comprises estimating Signal-and-Interference-to-Noise Ratio (SINR) of the received PDCCH by puncturing bit estimates extracted from the received PDCCH to effectively change a code rate to modify the effective SINR.

17. The method of claim 1, wherein the PDCCHs from which the selectable portion is used comprises: a downlink or uplink scheduling PDCCH, a wake-up signal PDCCH, a power saving PDCCH, and/or a paging or system information PDCCH.

18. A user equipment (UE) configured to receive a physical downlink control channel (PDCCH) from a wireless network using a selectable portion of a plurality of available resources, the UE comprising:
communication circuitry configured to communicate with the wireless network; and
processing circuitry operatively associated with the communication circuitry, whereby the processing circuitry and communication circuitry are configured such that the user equipment is operative to:
determine one or more PDCCH reception quality metrics for each of a plurality of candidate subsets of the available resources;
select a particular candidate subset out of the plurality of candidate subsets based on the determined PDCCH reception quality metrics; and
monitor for PDCCH transmissions using only the selected subset of resources, wherein:
verifying a CRC field comprises verifying the CRC field in each received first PDCCH transmission a plurality of times, with each verification of the CRC field being associated with a different amount of degradation of the received PDCCH transmission; and
determining the PDCCH reception quality metric for each first PDCCH transmission comprises selecting the maximum amount of degradation under which the verification of the CRC field is successful.

19. A non-transitory computer readable recording medium storing a computer program product for controlling a user equipment (UE) for receiving a physical downlink control channel (PDCCH) from a wireless network using a selectable portion of a plurality of available resources, the computer program product comprising program instructions which, when run on processing circuitry of the UE, causes the UE to:
determine one or more PDCCH reception quality metrics for each of a plurality of candidate subsets of the available resources;
select a particular candidate subset out of the plurality of candidate subsets based on the determined PDCCH reception quality metrics; and
monitor for PDCCH transmissions using only the selected subset of resources, wherein:
verifying a CRC field comprises verifying the CRC field in each received first PDCCH transmission a plurality of times, with each verification of the CRC field being associated with a different amount of degradation of the received PDCCH transmission; and
determining the PDCCH reception quality metric for each first PDCCH transmission comprises selecting the maximum amount of degradation under which the verification of the CRC field is successful.

* * * * *